United States Patent
Darvish Rouhani et al.

(10) Patent No.: US 11,676,003 B2
(45) Date of Patent: Jun. 13, 2023

(54) TRAINING NEURAL NETWORK ACCELERATORS USING MIXED PRECISION DATA FORMATS

(71) Applicant: Microsoft Technology Licensing, LLC, Redmond, WA (US)

(72) Inventors: Bita Darvish Rouhani, Bellevue, WA (US); Taesik Na, Sammamish, WA (US); Eric S. Chung, Woodinville, WA (US); Daniel Lo, Bothell, WA (US); Douglas C. Burger, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1048 days.

(21) Appl. No.: 16/223,603

(22) Filed: Dec. 18, 2018

(65) Prior Publication Data

US 2020/0193274 A1     Jun. 18, 2020

(51) Int. Cl.
*G06N 20/00*     (2019.01)
*G06N 3/063*     (2023.01)
*G06F 17/15*     (2006.01)
*G06F 17/16*     (2006.01)
*G06N 3/084*     (2023.01)

(52) U.S. Cl.
CPC ............ *G06N 3/063* (2013.01); *G06F 17/15* (2013.01); *G06F 17/16* (2013.01); *G06N 3/084* (2013.01); *G06N 20/00* (2019.01)

(58) Field of Classification Search
CPC ........ G06T 3/4084; G06T 7/593; G06T 7/97; G06T 2207/20052; G06T 7/55; G06F 17/16

See application file for complete search history.

(56) References Cited

U.S. PATENT DOCUMENTS

| | | | |
|---|---|---|---|
| 6,144,977 | A | 11/2000 | Giangarra et al. |
| 10,167,800 | B1 | 1/2019 | Chung et al. |
| 2014/0289445 | A1 | 9/2014 | Savich |
| 2016/0328646 | A1 | 11/2016 | Lin et al. |
| 2018/0157465 | A1 | 6/2018 | Bittner et al. |
| 2018/0322607 | A1* | 11/2018 | Mellempudi ........... G06F 17/16 |

(Continued)

OTHER PUBLICATIONS

"Drumond, (End-to-End DNN Training with Block Floating Point Arithmetic, 2018)" (Year: 2018).*

(Continued)

*Primary Examiner* — David R Vincent
(74) *Attorney, Agent, or Firm* — Klarquist Sparkman, LLP

(57) ABSTRACT

Technology related to training a neural network accelerator using mixed precision data formats is disclosed. In one example of the disclosed technology, a neural network accelerator is configured to accelerate a given layer of a multi-layer neural network. An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The converted result can be used to generate an output tensor of the layer of the neural network, where the output tensor is in normal-precision floating-point format.

23 Claims, 10 Drawing Sheets

(56) References Cited

U.S. PATENT DOCUMENTS

| | | | | |
|---|---|---|---|---|
| 2019/0035132 | A1* | 1/2019 | Dirksen | G06T 17/20 |
| 2019/0205746 | A1* | 7/2019 | Nurvitadhi | G06N 3/08 |
| 2019/0332925 | A1* | 10/2019 | Modha | G06N 3/063 |
| 2020/0104131 | A1* | 4/2020 | Liguori | G06F 9/30036 |
| 2020/0193273 | A1* | 6/2020 | Chung | G06F 9/54 |

OTHER PUBLICATIONS

"Guo (A Survey on Methods and Theories of Quantized Neural Networks, 2018)" (Year: 2018).*

Anonymous, Artificial Intelligence Index 2017 Annual Report, Nov. 2017, 101 pages.

Baydin et al., "Automatic Differentiation in Machine Learning: a Survey," Journal of Machine Learning Research 18 (2018), Feb. 5, 2018, 43 pages (also published as arXiv:1502.05767v4 [cs.SC] Feb. 5, 2018).

Bulò et al., "In-Place Activated BatchNorm for Memory-Optimized Training of DNNs," 2018 IEEE/CVF Conference on Computer Vision and Pattern Recognition, Jun. 2018, pp. 5639-5647 (also published as arXiv:1712.02616 [cs.CV]).

Burger, "Accelerating Persistent Neural Networks at Datacenter Scale," Microsoft Corporation, 52 pp. accessed April 18, 2018, available at: https://www.microsoft.com/en-us/research/blog/microsoft-unveils-project-brainwave/.

Burger, "Microsoft Unveils Project Brainwave for Real-Time AI," Microsoft Corporation, 3 pp (Aug. 18, 2018).

Chen et al., "Compressing Neural Networks with the Hashing Trick," In International Conference on Machine Learning, pp. 2285-2294, 2015 (also cited as arXiv:1504.04788v1 [cs.LG] Apr. 19, 2015).

Chiu et al., State-of-the-art Speech Recognition with Sequence-to-Sequence Models. CoRR, abs/1712.01769, 2017 (also cited as arXiv:1712.01769v6 [cs.CL] Feb. 23, 2018).

Chung et al., "Serving DNNs in Real Time at Datacenter Scale with Project Brainwave," IEEE Micro Pre-Print, 11 pages accessed Apr. 4, 2018, available at https://www.microsoft.com/en-us/research/uploads/prod/2018/03/mi0218_Chung-2018Mar25.pdf, also published as "Serving DNNs in Real Time at Datacenter Scale with Project Brainwave," IEEE Micro, vol. 38, Issue 2, Mar./Apr. 2018.

Colah, "Understanding LSTM Networks," posted on Aug. 27, 2015, 13 pages.

Courbariaux et al., "Low precision arithmetic for deep learning," also available as arXiv:1412.7024v1, Dec. 2014.

Courbariaux et al., "Binarized Neural Networks: Training Neural Networks with Weights and Activations Constrained to +1 or −1," arXiv preprint arXiv:1602.02830v3, Mar. 2016, 11 pages.

Courbariaux et al., "Binaryconnect: Training Deep Neural Networks with Binary Weights During Propagations," In Proceedings of the 28th International Conference on Neural Information Processing Systems, vol. 2, Dec. 2015, 9 pages.

Courbariaux et al., "Training Deep Neural Networks with Low Precision Multiplications," Sep. 23, 2015, 10 pages.

CS231n Convolutional Neural Networks for Visual Recognition, downloaded from cs231n.github.io/optimization-2, Dec. 20, 2018, 9 pages.

Denil et al., Predicting Parameters in Deep Learning, In Advances in Neural Information Processing Systems, Dec. 2013, pp. 2148-2156.

Elam et al., "A Block Floating Point Implementation for an N-Point FFT on the TMS320C55x DSP," Texas Instruments Application Report SPRA948, Sep. 2003, 13 pages.

"FFT/IFFT Block Floating Point Scaling," Altera Corporation Application Note 404, Oct. 2005, ver. 1.0, 7 pages.

Goodfellow et al., "Deep Learning," downloaded from http://www.deeplearningbook.org/ on May 2, 2018, (document dated 2016), 766 pages.

Gomez, "Backpropagating an LSTM: A Numerical Example," Apr. 18, 2016, downloaded from medium.com/@aidangomez/let-s-do-this-f9b699de31d9, Dec. 20, 2018, 8 pages.

Gupta et al., "Deep Learning with Limited Numerical Precision," Feb. 9, 2015, 10 pages.

Han et al., "Deep Compression: Compressing Deep Neural Networks with Pruning, Trained Quantization and Huffman Coding," arXiv preprint arXiv:1510.00149v5 [cs:CV], Feb. 15, 2016, 14 pages.

Hassan et al., "Achieving Human Parity on Automatic Chinese to English News Translation," CoRR, abs/1803.05567, 2018 (also published as arXiv:1803.05567v2 [cs.CL] Jun. 29, 2018).

He et al., "Deep Residual Learning for Image Recognition," arXiv preprint arXiv:1512.03385v1 [cs.CV] Dec. 10, 2015.

Ioffe et al., "Batch Normalization: Accelerating Deep Network Training by Reducing Internal Covariate Shift," arXiv:1502.03167v3 [cs.LG], Mar. 2015, 11 pages.

Jain et al., "Gist: Efficient Data Encoding for Deep Neural Network Training," 2018 ACM/IEEE 45th Annual International Symposium on Computer Architecture, Jun. 2018, 14 pages.

Karl N's Blog., "Batch Normalization—What the hey?," Posted on Jun. 7, 2016, downloaded from gab41.lab41.org/batch-normalization-what-the-hey-d480039a9e3b, Jan. 9, 2019, 7 pages.

Kevin's Blog, "Deriving the Gradient for the Backward Pass of Batch Normalization," Posted on Sep. 14, 2016, downloaded from kevinzakka.github.io/2016/09/14/batch_normalization/, Jan. 9, 2019, 7 pages.

Köster et al., "Flexpoint: An Adaptive Numerical Format for Efficient Training of Deep Neural Networks," In Advances in Neural Information Processing Systems, pp. 1742-1752, 2017 (also published as arXiv:1711.02213v2 [cs:LG] Dec. 2, 2017).

Kratzert's Blog, "Understanding the backward pass through Batch Normalization Layer," Posted on Feb. 12, 2016, downloaded from kratzert.github.io/2016/02/12/understanding-the-gradient-flow-through-the-bathch-nor . . . on Jan. 9, 2019, 17 pages.

Langhammer et al., "Floating-Point DSP Block Architecture for FPGAs," Proceedings of the 2015 ACM/SIGDA International Symposium on Field-Programmable Gate Arrays, Feb. 2015, pp. 117-125.

Le et al., "Neural Architecture Search with Reinforcement Learning," PowerPoint presentation, 37 pages.

Le, "A Tutorial on Deep Learning, Part 1: Nonlinear Classifiers and the Backpropagation Algorithm," Dec. 2015, 18 pages.

Le, "A Tutorial on Deep Learning, Part 2: Autoencoders, Convolutional Neural Networks and Recurrent Neural Networks," Oct. 2015, 20 pages.

Lecun et al., "Optimal Brain Damage," in Advances in Neural Information Processing Systems, Nov. 1989, pp. 598-605.

Li et al., "Stochastic Modified Equations and Adaptive Stochastic Gradient Algorithms," Proceedings of the 34th International Conference on Machine Learning, PMLR 70, 2017, 10 pages.

Li et al., "Ternary eight networks," arXiv preprint arXiv:1605.04711v2 [cs:CV] Nov. 19, 2016.

Lin et al., "Fixed Point Quantization of Deep Convolutional Networks," In International Conference on Machine Learning, pp. 2849-2858, 2016 (also published as arXiv:1511.06393v3 [cs:LG] Jun. 2, 2016).

Liu, "DARTS: Differentiable Architecture Search," arXiv:1806.09055v1 [cs.LG], Jun. 24, 2018, 12 pages.

Mellempudi et al., "Ternary Neural Networks with Fine-Grained Quantization," May 2017, 11 pages.

Mendis et al., "Helium: Lifting High-Performance Stencil Kernals from Stripped x86 Binaries to Halide DDL Code," Proceedings of the 36th ACM SIGPLAN Conference on Programming Languate Design and Implementation, Jun. 2015, pp. 391-402.

Mishra et al., "Apprentice: Using Knowledge Distillation Techniques to Improve Low-Precision Network Accuracy," arXiv preprint arXiv:1711.05852v1 [cs:LG] Nov. 15, 2017.

Muller et al., "Handbook of Floating-Point Arithmetic," Birkhäuser Boston (New York 2010), 78 pages including pp. 269-320.

Nielsen, "Neural Networks and Deep Learning," downloaded from http://neuralnetworksanddeeplearning.com/index.html on May 2, 2018, document dated Dec. 2017, 314 pages.

Nvidia. Nvidia tensorrt optimizer, https://developer.nvidia.com/tensorrt downloaded on Mar. 4, 2019, 9 pages.

(56) References Cited

OTHER PUBLICATIONS

Page, "Neural Networks and Deep Learning," www.cs.wise.edu/~dpage/cs760/, 73 pp.

Park et al., "Energy-efficient Neural Network Accelerator Based on Outlier-aware Low-precision Computation," 2018 ACM/IEEE 4th Annual International Symposium on Computer Architecture, Jun. 2018, pp. 688-698.

Rajagopal et al., "Synthesizing a Protocol Converter from Executable Protocol Traces," IEEE Transactions on Computers, vol. 40, No. 4, Apr. 1991, pp. 487-499.

Rajpurkar et al., "SQuAD: 100,000+ Questions for Machine Comprehension of Text," Proceedings of the 2016 Conference on Empirical Methods in Natural Language Processing, Nov. 2016, pp. 2383-2392.

Rastegari et al., "XNOR-Net: ImageNet Classification Using Binary Convolutional Neural Networks," In Proceedings of 14th Annual European Conference on Computer Vision, pp. 525-542. Oct. 2016.

"Russakovsky et al., ""ImageNet Large Scale Visual Recognition Challenge,"" International Journal of Computer Vision (IJCV), vol. 115, Issue 3, Dec. 2015, pp. 211-252 (also published as zrXiv:1409.0575v3 [cs.CV] Jan. 30, 2015)."

Russinovich, "Inside the Microsoft FPGA-based Configurable Cloud," Microsoft Corporation, https://channel9.msdn.com/Events/Build/2017/B8063, 8 pp. (May 8, 2017).

Russinovich, "Inside the Microsoft FPGA-based Configurable Cloud," Microsoft Corporation, Powerpoint Presentation; 41 pp. (May 8, 2017).

Smith et al., "A Bayesian Perspective on Generalization and Stochastic Gradient Descent," 6th International Conference on Learning Representations, Apr.-May 2018, 13 pages.

Szegedy et al., "Inception-v4, Inception-ResNet and the Impact of Residual Connections on Learning," arXiv:1602.07261v2, Aug. 23, 2016, 12 pages.

Szegedy et al., "Rethinking the Inception Architecture for Computer Vision," arXiv:1512.00567v3 [cs.CV] Dec. 11, 2015, 10 pages.

Tensorflow-slim image classification model library. https://github.com/tensorflow/models/tree/master/research/slim, downloaded on Mar. 4, 2019, 8 pages.

TITU1994 Blog, "Neural Architecture Search with Controller RNN," downloaded from github.com/titu1994/neural-architecture-search on Jan. 9, 2019, 3 pages.

Vanhoucke et al., "Improving the speed of neural networks on CPUs," In Deep Learning and Unsupervised Feature Learning Workshop, Dec. 2011, 8 pages.

Vucha et al., "Design and FPGA Implementation of Systolic Array Architecture for Matrix Multiplication," International Journal of Computer Applications, vol. 26, No. 3, Jul. 2011, 5 pages.

Weinberger et al., "Feature Hashing for Large Scale Multitask Learning," In Proceedings of the 26th Annual International Conference on Machine Learning, Jun. 2009, 8 pages.

Wen et al., "Learning Structured Sparsity in Deep Neural Networks," In Advances in Neural Information Processing Systems, Dec. 2016, pp. 2074-2082 (also published as arXiv:1608.036654v4 [cs.NE] Oct. 18, 2016).

Wilkinson, "Rounding Errors in Algebraic Processes," Notes on Applied Science No. 32, Department of Scientific and Industrial Research, National Physical Laboratory (United Kingdom) (London 1963), 50 pages including pp. 26-33, 79-91, and 122-139.

Wired, "Microsoft's Internet Business Gets a New Kind of Processor," 11 pp. Apr. 19, 2018, available at: https://www.wired.com/2016/09/microsoft-bets-future-chip-reprogram-fly/.

Xiong et al., "Achieving Human Parity in Conversational Speech Recognition," arXiv:1610.05256v2 [cs:CL] Feb. 17, 2017, 13 pages.

Yeh, "Deriving Batch-Norm Backprop Equations," downloaded from chrisyeh96.github.io/2017/08/28/deriving-batchnorm-backprop on Dec. 20, 2018, 5 pages.

Zhou et al., "DoReFa-net: Training Low Bitwidth Convolutional Neural Networks with Low Bitwidth Gradients," arXiv:1606.06160v3 [cs.NE] Feb. 2, 2018, 13 pages.

Zoph et al., "Learning Transferable Architectures for Scalable Image Recognition," arXiv.1707.07012v1, Jul. 2017, 14 pages.

Zoph et al., "Neural Architecture Search with Reinforcement Learning," 5th International Conference on Learning Representations, Apr. 2017, 16 pages.

"International Search Report and Written Opinion Issued in PCT Application No. PCT/US19/064567", dated Mar. 5, 2020, 10 Pages.

Drumond, et al., "Training DNNs with Hybrid Block Floating Point", In repository of arXiv, arXiv:1804.01526, Apr. 4, 2018, 11 Pages.

"Extended European Search Report Issued in European Application No. 21194421.0", dated Jan. 12, 2022, 4 Pages.

"Notice of Allowance Issued in European Patent Application No. 21194421.0", dated Jul. 28, 2022, 2 Pages.

"Notice of Allowance Issued in European Patent Application No. 21194421.0", dated Mar. 21, 2022, 7 Pages.

"Office Action Issued in Indian Patent Application No. 202147026958", dated Jan. 9, 2023, 6 Pages.

* cited by examiner

FIG. 4
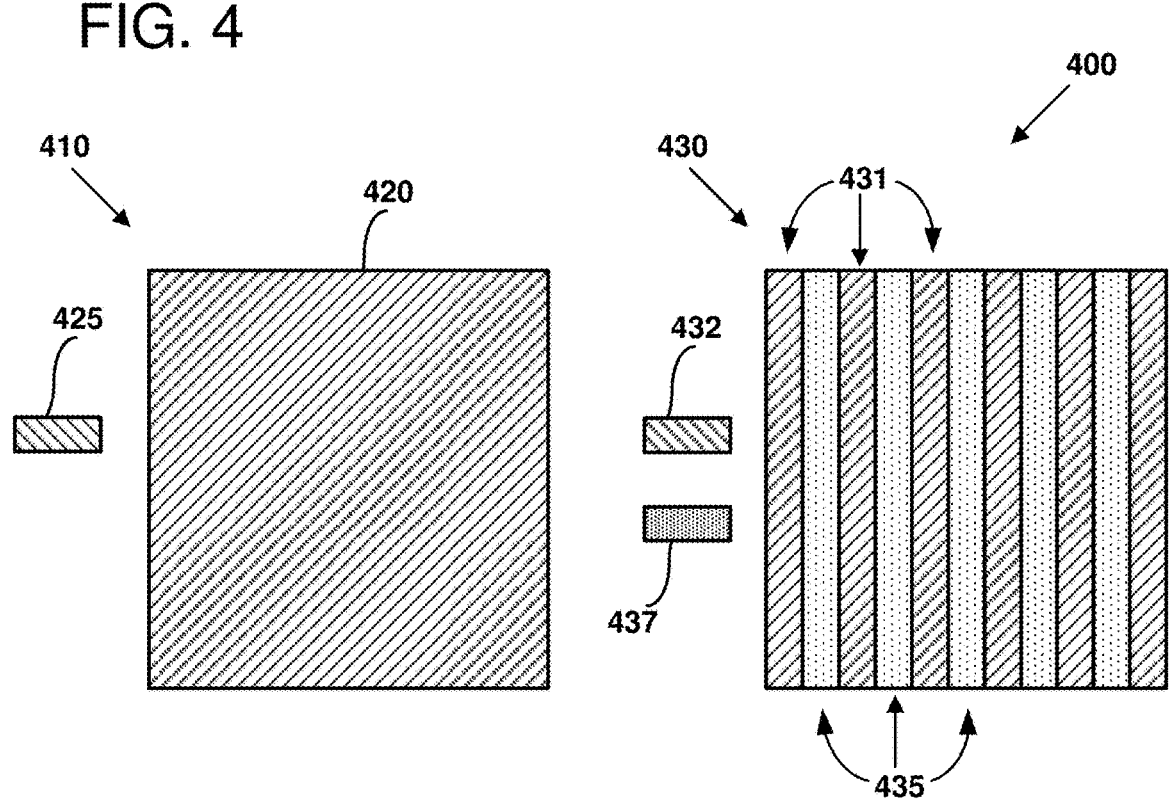
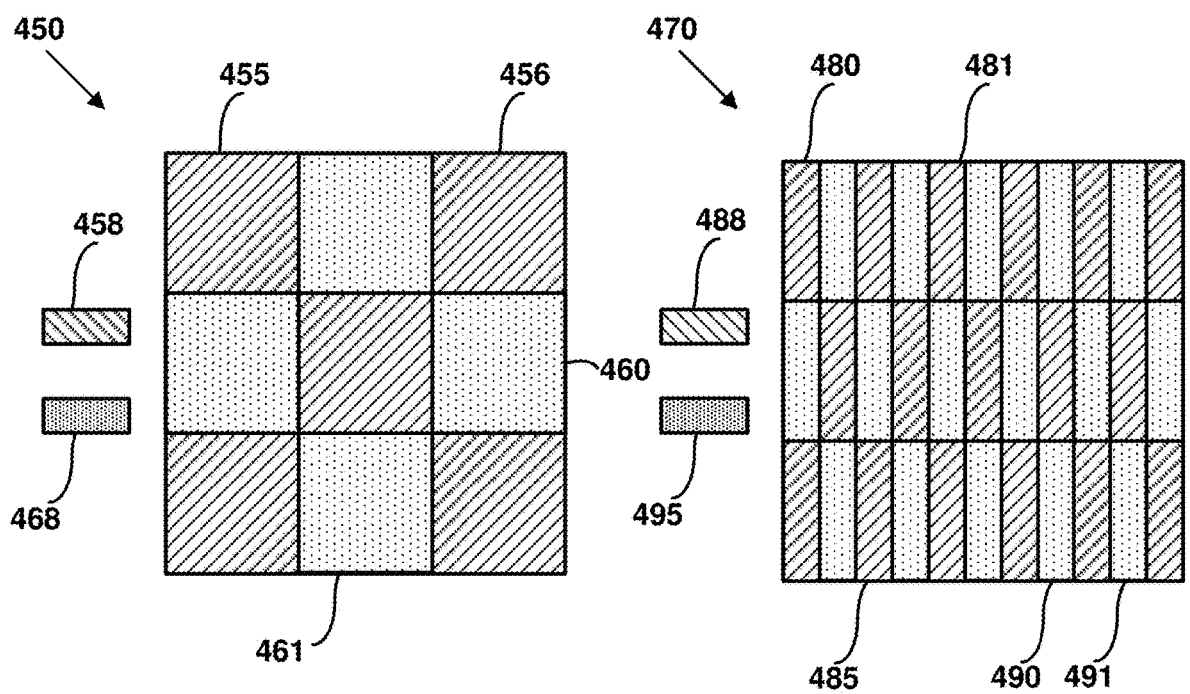

FIG. 5
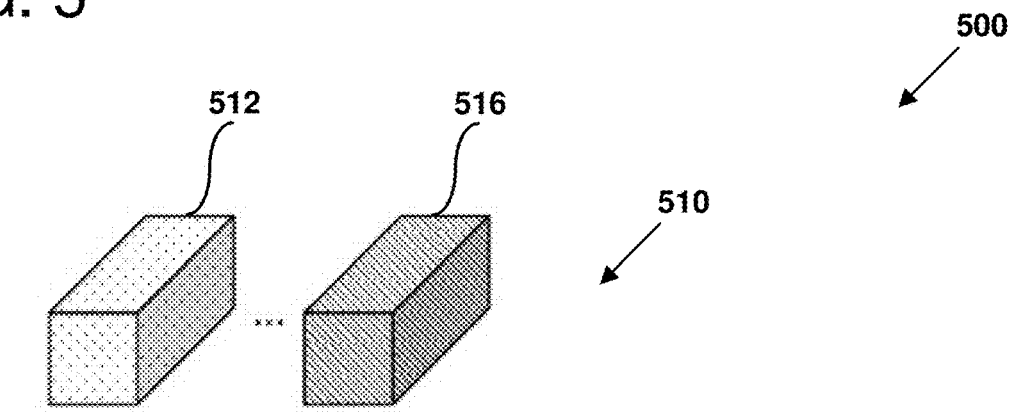
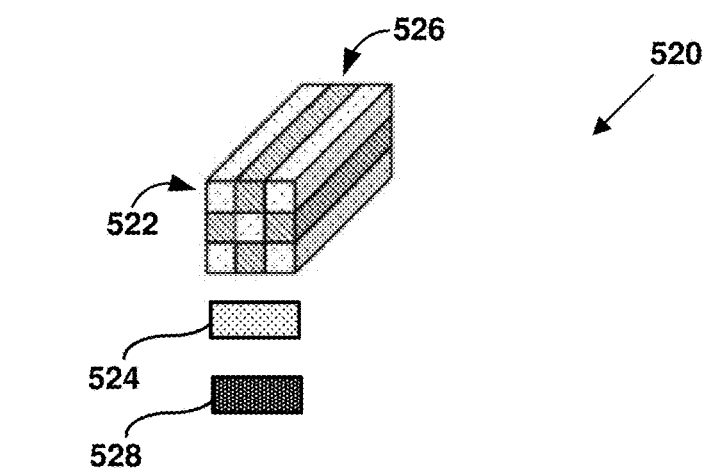
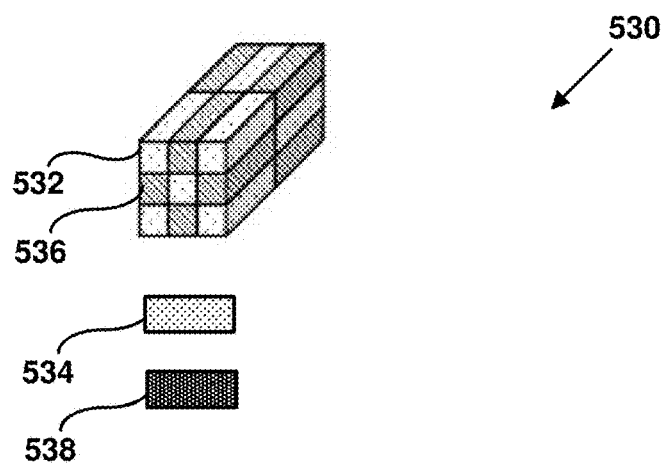

TRAINING NEURAL NETWORK ACCELERATORS USING MIXED PRECISION DATA FORMATS

BACKGROUND

Machine learning (ML) and artificial intelligence (AI) techniques can be useful for solving a number of complex computational problems such as recognizing images and speech, analyzing and classifying information, and performing various classification tasks. Machine learning is a field of computer science that uses statistical techniques to give computer systems the ability to extract higher-level features from a set of training data. Specifically, the features can be extracted by training a model such as an artificial neural network (NN) or a deep neural network (DNN). After the model is trained, new data can be applied to the model and the new data can be classified (e.g., higher-level features can be extracted) using the trained model. Machine learning models are typically executed on a general-purpose processor (also referred to as a central processing unit (CPU)). However, using the models can be computationally expensive and so it may not be possible to perform feature extraction in real-time using general-purpose processors. Reducing the computational complexity of using the models can potentially decrease the time to extract a feature during inference, decrease the time for adjustment during training, and/or reduce energy consumption during training and/or inference. Accordingly, there is ample opportunity for improvements in computer hardware and software to implement neural networks.

SUMMARY

Technology related to training a neural network accelerator using mixed precision data formats is disclosed. In one example of the disclosed technology, a neural network accelerator is configured to accelerate a given layer of a multi-layer neural network. An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The converted result can be used to generate an output tensor of the layer of the neural network, where the output tensor is in normal-precision floating-point format.

BRIEF DESCRIPTION OF THE DRAWINGS

FIG. 4 depicts a number of alternative block floating-point formats that can be used to represent quantized neural network models, as can be used in certain examples of the disclosed technology.

FIG. 5 depicts a number of alternative block floating-point formats that can be used to represent quantized neural network models, as can be used in certain examples of the disclosed technology.

DETAILED DESCRIPTION

General Considerations

Figure 1:
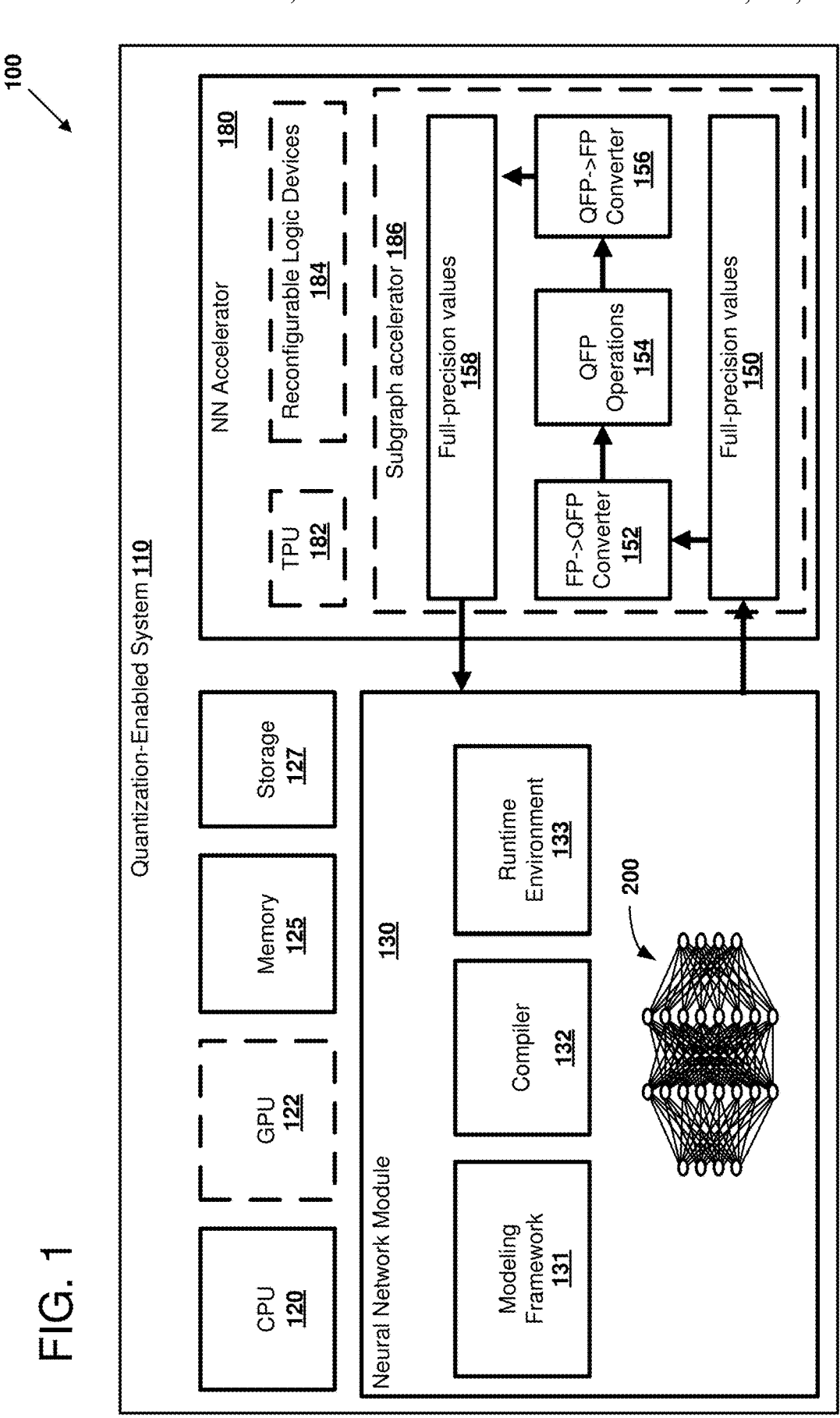
FIG. 1 is a block diagram of a quantization-enabled system, as can be implemented in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," and "initiate" to describe the disclosed methods.

These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

Artificial Neural Networks (ANNs or as used throughout herein, "NNs") are applied to a number of applications in Artificial Intelligence and Machine Learning including image recognition, speech recognition, search engines, and other suitable applications. The processing for these applications may take place on individual devices such as personal computers or cell phones, but it may also be performed in large datacenters. At the same time, hardware accelerators that can be used with NNs include specialized NN processing units, such as tensor processing units (TPUs) and Field Programmable Gate Arrays (FPGAs) programmed to accelerate neural network processing. Such hardware devices are being deployed in consumer devices as well as in data centers due to their flexible nature and low power consumption per unit computation.

Traditionally NNs have been trained and deployed using single-precision floating-point (32-bit floating-point or float32 format). However, it has been shown that lower precision floating-point formats, such as 16-bit floating-point (float16) or fixed-point can be used to perform inference operations with minimal loss in accuracy. On specialized hardware, such as FPGAs, reduced precision formats can greatly improve the latency and throughput of DNN processing.

Numbers represented in normal-precision floating-point format (e.g., a floating-point number expresses in a 16-bit floating-point format, a 32-bit floating-point format, a 64-bit floating-point format, or an 80-bit floating-point format) can be converted to quantized-precision format numbers may allow for performance benefits in performing operations. In particular, NN weights and activation values can be represented in a lower-precision quantized format with an acceptable level of error introduced. Examples of lower-precision quantized formats include formats having a reduced bit width (including by reducing the number of bits used to represent a number's mantissa or exponent) and block floating-point formats where two or more numbers share the same single exponent.

One of the characteristics of computation on an FPGA device is that it typically lacks hardware floating-point support. Floating-point operations may be performed at a penalty using the flexible logic, but often the amount of logic needed to support floating-point is prohibitive in FPGA implementations. Some newer FPGAs have been developed that do support floating-point computation, but even on these the same device can produce twice as many computational outputs per unit time as when it is used in an integer mode. Typically, NNs are created with floating-point computation in mind, but when an FPGA is targeted for NN processing it would be beneficial if the neural network could be expressed using integer arithmetic. Examples of the disclosed technology include hardware implementations of block Floating-point (BFP), including the use of BFP in NN, FPGA, and other hardware environments.

A typical floating-point representation in a computer system consists of three parts: sign (s), exponent (e), and mantissa (m). The sign indicates if the number is positive or negative. The exponent and mantissa are used as in scientific notation:

$$\text{Value} = s \times m \times 2^e$$

Any number may be represented, within the precision limits of the mantissa. Since the exponent scales the mantissa by powers of 2, just as the exponent does by powers of 10 in scientific notation, the magnitudes of very large numbers may be represented. The precision of the representation is determined by the precision of the mantissa. Typical floating-point representations use a mantissa of 10 (float 16), 24 (float 32), or 53 (float64) bits in width. An integer with magnitude greater than $2^{53}$ can be approximated in a float64 floating-point format, but it will not be represented exactly because there are not enough bits in the mantissa. A similar effect can occur for arbitrary fractions where the fraction is represented by bits of the mantissa that take on the value of negative powers of 2. There are many fractions that cannot be exactly represented because they are irrational in a binary number system. More exact representations are possible in both situations, but they may require the mantissa to contain more bits. Ultimately, an infinite number of mantissa bits are required to represent some numbers exactly $$\left(e.g., \frac{1}{3} = 0.\overline{3}; \frac{22}{2} = 3.\overline{142857}\right).$$

The 10-bit (half precision float), 24-bit (single precision float), and 53-bit (double precision float) mantissa limits are common compromises of mantissa storage requirements versus representation precision in general-purpose computers.

With block floating-point formats, a group of two or more numbers use a single shared exponent with each number still having its own sign and mantissa. In some examples, the shared exponent is chosen to be the largest exponent of the original floating-point values. For purposes of the present disclosure, the term block floating-point (BFP) means a number system in which a single exponent is shared across two or more values, each of which is represented by a sign and mantissa pair (whether there is an explicit sign bit, or the mantissa itself is signed). In some examples, all values of one or more rows or columns of a matrix or vector, or all values of a matrix or vector, can share a common exponent. In other examples, the BFP representation may be unsigned. In some examples, some but not all of the elements in a matrix or vector BFP representation may include numbers represented as integers, floating-point numbers, fixed point numbers, symbols, or other data formats mixed with numbers represented with a sign, mantissa, and exponent. In some examples, some or all of the elements in a matrix or vector BFP representation can include complex elements having two or more parts, for example: complex numbers with an imaginary component (a+bi, where i=$\sqrt{-1}$); fractions including a numerator and denominator, in polar coordinates (r, θ), or other multi-component element.

BFP formats can be used to tradeoff precision and storage requirements, in a fashion that is similar in some respects to normal floating-point. First, rather than storing an exponent with every floating-point number, a group of numbers can share the same exponent. To share exponents while maintaining a high level of accuracy, the numbers should have close to the same magnitude, since differences in magnitude are expressed in the mantissa. If the differences in magnitude are too great, the mantissa will overflow for the large values, or may be zero ("underflow") for the smaller values. Depending on a particular application, some amount of overflow and/or underflow may be acceptable.

The size of the mantissa can be adjusted to fit a particular application. This can affect the precision of the number being represented, but potential gains are realized from a reduced representation size. For example, a normal single-precision float has a size of four bytes, but for certain implementations of the disclosed technology, only two bytes are used to represent the sign and mantissa of each value. In some implementations, the sign and mantissa of each value can be represented in a byte or less.

In certain examples of the disclosed technology, the representation expressed above is used to derive the original number from the representation, but only a single exponent is stored for a group of numbers, each of which is represented by a signed mantissa. Each signed mantissa can be represented by two bytes or less, so in comparison to four-byte floating-point, the memory storage savings is about 2×. Further, the memory bandwidth requirements of loading and storing these values are also approximately one-half that of normal floating-point.

Neural network operations are used in many artificial intelligence operations. Often, the bulk of the processing operations performed in implementing a neural network is in performing Matrix×Matrix or Matrix×Vector multiplications or convolution operations. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As discussed herein, BFP techniques can be applied to such operations to reduce the demands for computation as well as memory bandwidth in a given system, whether it is an FPGA, CPU or another hardware platform. As used herein, the use of the term "element" herein refers to a member of such a matrix or vector.

As used herein, the term "tensor" refers to a multi-dimensional array that can be used to represent properties of a NN and includes one-dimensional vectors as well as two-, three-, four-, or larger dimension matrices. As used in this disclosure, tensors do not require any other mathematical properties unless specifically stated.

As used herein, the term "normal-precision floating-point" refers to a floating-point number format having a mantissa, exponent, and optionally a sign and which is natively supported by a native or virtual CPU. Examples of normal-precision floating-point formats include, but are not limited to, IEEE 754 standard formats such as 16-bit, 32-bit, 64-bit, or to other processors supported by a processor, such as Intel AVX, AVX2, IA32, and x86_64 80-bit floating-point formats.

A given number can be represented using different precision (e.g., mixed precision) formats. For example, a number can be represented in a higher precision format (e.g., float32) and a lower precision format (e.g., float16). Lowering the precision of a number can include reducing the number of bits used to represent the mantissa or exponent of the number. Additionally, lowering the precision of a number can include reducing the range of values that can be used to represent an exponent of the number, such as when multiple numbers share a common exponent. Similarly, increasing the precision of a number can include increasing the number of bits used to represent the mantissa or exponent of the number. Additionally, increasing the precision of a number can include increasing the range of values that can be used to represent an exponent of the number, such as when a number is separated from a group of numbers that shared a common exponent. As used herein, converting a number from a higher precision format to a lower precision format may be referred to as down-casting or quantizing the number. Converting a number from a lower precision format to a higher precision format may be referred to as up-casting or de-quantizing the number.

As used herein, the term "quantized-precision floating-point" refers to a floating-point number format where two or more values of a tensor have been modified to have a lower precision than when the values are represented in normal-precision floating-point. In particular, many examples of quantized-precision floating-point representations include block floating-point formats, where two or more values of the tensor are represented with reference to a common exponent. The quantized-precision floating-point number can be generated by selecting a common exponent for two, more, or all elements of a tensor and shifting mantissas of individual elements to match the shared, common exponent. In some examples, groups of elements within a tensor can share a common exponent on, for example, a per-row, per-column, per-tile, or other basis.

In one example of the disclosed technology, a neural network accelerator is configured to accelerate a given layer of a multi-layer neural network using mixed precision data formats. For example, the mixed precision data formats can include a normal-precision floating-point format and a quantized-precision floating-point format. An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The converted result can be used to generate an output tensor of the layer of the neural network, where the output tensor is in normal-precision floating-point format. In this manner, the neural network accelerator can potentially be made smaller and more efficient than a comparable accelerator that uses only a normal-precision floating-point format. A smaller and more efficient accelerator may have increased computational performance and/or increased energy efficiency. Additionally, the neural network accelerator can potentially have increased accuracy compared to an accelerator that uses only a quantized-precision floating-point format. By increasing the accuracy of the accelerator, a convergence time for training may be decreased and the accelerator may be more accurate when classifying inputs to the neural network.

Example Architectures for Using Mixed Precision Floating-Point to Train Neural Networks FIG. 1 is a block diagram 100 outlining an example quantization-enabled system 110 as can be implemented certain examples of the disclosed technology. As shown in FIG. 1, the quantization-enabled system 110 can include a number of hardware resources including general-purpose processors 120 and special-purpose processors such as graphics processing units 122 and neural network accelerator 180. The processors are coupled to memory 125 and storage 127, which can include volatile or non-volatile memory devices. The processors 120 and 122 execute instructions stored in the memory or storage in order to provide a neural network module 130. The neural network module 130 includes software interfaces that allow the system to be programmed to implement various types of neural networks. For example, software functions can be provided that allow applications to define neural networks including weights, biases, activation functions, node values, and interconnections between layers of a neural network. Additionally, software functions can be used to define state elements for recurrent neural networks. The neural network module 130 can further provide utilities to allow for training and retraining of a neural network implemented with the module. Values representing the neural network module are stored in memory or storage and are operated on by instructions executed by one of the processors. The values stored in memory or storage can be represented using normal-precision floating-point and/or quantized floating-point values.

In some examples, proprietary or open source libraries or frameworks are provided to a programmer to implement neural network creation, training, and evaluation. Examples of such libraries include TensorFlow, Microsoft Cognitive Toolkit (CNTK), Caffe, Theano, and Keras. In some examples, programming tools such as integrated development environments provide support for programmers and users to define, compile, and evaluate NNs.

The neural network accelerator 180 can be implemented as a custom or application-specific integrated circuit (e.g., including a system-on-chip (SoC) integrated circuit), as a field programmable gate array (FPGA) or other reconfigurable logic, or as a soft processor virtual machine hosted by a physical, general-purpose processor. The neural network accelerator 180 can include a tensor processing unit 182, reconfigurable logic devices 184, and/or one or more neural processing cores (such as the subgraph accelerator 186). The subgraph accelerator 186 can be configured in hardware, software, or a combination of hardware and software. As one example, the subgraph accelerator 186 can be configured and/or executed using instructions executable on the tensor processing unit 182. As another example, the subgraph accelerator 186 can be configured by programming reconfigurable logic blocks 184. As another example, the subgraph accelerator 186 can be configured using hard-wired logic gates of the neural network accelerator 180.

The subgraph accelerator 186 can be programmed to execute a subgraph or an individual node of a neural network. For example, the subgraph accelerator 186 can be programmed to execute a subgraph included a layer of a NN. The subgraph accelerator 186 can access a local memory used for storing weights, biases, input values, output values, and so forth. The subgraph accelerator 186 can have many inputs, where each input can be weighted by a different weight value. For example, the subgraph accelerator 186 can produce a dot product of an input tensor and the programmed input weights for the subgraph accelerator 186. In some examples, the dot product can be adjusted by a bias value before it is used as an input to an activation function. The output of the subgraph accelerator 186 can be stored in the local memory, where the output value can be accessed and sent to a different NN processor core and/or to the neural network module 130 or the memory 125, for example.

The neural network accelerator 180 can include a plurality 110 of subgraph accelerators 186 that are connected to each other via an interconnect (not shown). The interconnect can carry data and control signals between individual subgraph accelerators 186, a memory interface (not shown), and an input/output (I/O) interface (not shown). The interconnect can transmit and receive signals using electrical, optical, magnetic, or other suitable communication technology and can provide communication connections arranged according to a number of different topologies, depending on a particular desired configuration. For example, the interconnect can have a crossbar, a bus, a point-to-point bus, or other suitable topology. In some examples, any one of the plurality of subgraph accelerators 186 can be connected to any of the other cores, while in other examples, some cores are only connected to a subset of the other cores. For example, each core may only be connected to a nearest 4, 8, or 10 neighboring cores. The interconnect can be used to transmit input/output data to and from the subgraph accelerators 186, as well as transmit control signals and other information signals to and from the subgraph accelerators 186. For example, each of the subgraph accelerators 186 can receive and transmit semaphores that indicate the execution status of operations currently being performed by each of the respective subgraph accelerators 186. Further, matrix and vector values can be shared between subgraph accelerators 186 via the interconnect. In some examples, the interconnect is implemented as wires connecting the subgraph accelerators 186 and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from neural network accelerator 180 are not limited to full swing electrical digital signals, but the neural network accelerator 180 can be configured to include differential signals, pulsed signals, or other suitable signals for transmitting data and control signals.

In some examples, the quantization-enabled system 110 can include an optional quantization emulator that emulates functions of the neural network accelerator 180. The neural network accelerator 180 provides functionality that can be used to convert data represented in full precision floating-point formats in the neural network module 130 into quantized format values. The neural network accelerator 180 can also perform operations using quantized format values. Such functionality will be discussed in further detail below.

The neural network module 130 can be used to specify, train, and evaluate a neural network model using a tool flow that includes a hardware-agnostic modelling framework 131 (also referred to as a native framework or a machine learning execution engine), a neural network compiler 132, and a neural network runtime environment 133. The memory includes computer-executable instructions for the tool flow including the modelling framework 131, the neural network compiler 132, and the neural network runtime environment 133. The tool flow can be used to generate neural network data 200 representing all or a portion of the neural network model, such as the neural network model discussed below regarding FIG. 2. It should be noted that while the tool flow is described as having three separate tools (131, 132, and 133), the tool flow can have fewer or more tools in various examples. For example, the functions of the different tools (131, 132, and 133) can be combined into a single modelling and execution environment.

The neural network data 200 can be stored in the memory 125. The neural network data 200 can be represented in one or more formats. For example, the neural network data 200 corresponding to a given neural network model can have a different format associated with each respective tool of the tool flow. Generally, the neural network data 200 can include a description of nodes, edges, groupings, weights, biases, activation functions, and/or tensor values. As a specific example, the neural network data 200 can include source code, executable code, metadata, configuration data, data structures and/or files for representing the neural network model.

The modelling framework 131 can be used to define and use a neural network model. As one example, the modelling framework 131 can include pre-defined APIs and/or programming primitives that can be used to specify one or more aspects of the neural network model. The pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth). "Source code" can be used as an input to the modelling framework 131 to define a topology of the graph of a given neural network model. In particular, APIs of the modelling framework 131 can be instantiated and interconnected within the source code to specify a complex neural network model. A data scientist can create different neural network models by using different APIs, different numbers of APIs, and interconnecting the APIs in different ways.

In addition to the source code, the memory 125 can also store training data. The training data includes a set of input data for applying to the neural network model 200 and a desired output from the neural network model for each respective dataset of the input data. The modelling framework 131 can be used to train the neural network model with the training data. An output of the training is the weights and biases that are associated with each node of the neural network model. After the neural network model is trained, the modelling framework 131 can be used to classify new data that is applied to the trained neural network model. Specifically, the trained neural network model uses the weights and biases obtained from training to perform classification and recognition tasks on data that has not been used to train the neural network model. The modelling framework 131 can use the CPU 120 and the special-purpose processors (e.g., the GPU 122 and/or the neural network accelerator 180) to execute the neural network model with increased performance as compare with using only the CPU 120. In some examples, the performance can potentially achieve real-time performance for some classification tasks.

The compiler 132 analyzes the source code and data (e.g., the examples used to train the model) provided for a neural network model and transforms the model into a format that can be accelerated on the neural network accelerator 180, which will be described in further detail below. Specifically, the compiler 132 transforms the source code into executable code, metadata, configuration data, and/or data structures for representing the neural network model and memory as neural network data 200. In some examples, the compiler 132 can divide the neural network model into portions (e.g., neural network 200) using the CPU 120 and/or the GPU 122) and other portions (e.g., a neural network subgraph) that can be executed on the neural network accelerator 180. The compiler 132 can generate executable code (e.g., runtime modules) for executing subgraphs assigned to the CPU 120 and for communicating with the subgraphs assigned to the accelerator 180. The compiler 132 can generate configuration data for the accelerator 180 that is used to configure accelerator resources to evaluate the subgraphs assigned to the optional accelerator 180. The compiler 132 can create data structures for storing values generated by the neural network model during execution and/or training and for communication between the CPU 120 and the accelerator 180. The compiler 132 can generate metadata that can be used to identify subgraphs, edge groupings, training data, and various other information about the neural network model during runtime. For example, the metadata can include information for interfacing between the different subgraphs of the neural network model.

The runtime environment 133 provides an executable environment or an interpreter that can be used to train the neural network model during a training mode and that can be used to evaluate the neural network model in training, inference, or classification modes. During the inference mode, input data can be applied to the neural network model inputs and the input data can be classified in accordance with the training of the neural network model. The input data can be archived data or real-time data.

The runtime environment 133 can include a deployment tool that, during a deployment mode, can be used to deploy or install all or a portion of the neural network to neural network accelerator 180. The runtime environment 133 can further include a scheduler that manages the execution of the different runtime modules and the communication between the runtime modules and the neural network accelerator 180.

Thus, the runtime environment 133 can be used to control the flow of data between nodes modeled on the neural network module 130 and the neural network accelerator 180.

In one example, the neural network accelerator 180 receives and returns normal-precision values 150 from the neural network module 130. As illustrated in FIG. 1, the subgraph accelerator 186 can perform a bulk of its operations using quantized floating-point and an interface between the subgraph accelerator 186 and the neural network module 130 can use full-precision values for communicating information between the modules. The normal-precision values can be represented in 16-, 32-, 64-bit, or other suitable floating-point format. For example, a portion of values representing the neural network can be received, including edge weights, activation values, or other suitable parameters for quantization. The normal-precision values 150 are provided to a normal-precision floating-point to quantized floating-point converter 152, which converts the normal-precision value into quantized values. Quantized floating-point operations 154 can then be performed on the quantized values. The quantized values can then be converted back to a normal-floating-point format using a quantized floating-point to normal-floating-point converter which produces normal-precision floating-point values. As a specific example, the subgraph accelerator 186 can be used to accelerate a given layer of a neural network, and the vector-vector, matrix-vector, matrix-matrix, and convolution operations can be performed using quantized floating-point operations and less compute-intensive operations (such as adding a bias value or calculating an activation function) can be performed using normal-floating-point operations.

The conversions between normal floating-point and quantized floating-point performed by the converters 152 and 156 are typically performed on sets of numbers represented as vectors or multi-dimensional matrices. In some examples, additional normal-precision operations 158, including operations that may be desirable in particular neural network implementations can be performed based on normal-precision formats including adding a bias to one or more nodes of a neural network, applying a hyperbolic tangent function or other such sigmoid function, or rectification functions (e.g., ReLU operations) to normal-precision values that are converted back from the quantized floating-point format.

In some examples, the quantized floating values are used and stored only in the logic gates and internal memories of the neural network accelerator 180, and the memory 125 and storage 127 store only normal floating-point values. For example, the neural network accelerator 180 can quantize the inputs, weights, and activations for a neural network model that are received from the neural network model 130 and can de-quantize the results of the operations that are performed on the neural network accelerator 180 before passing the values back to the neural network model 130. Values can be passed between the neural network model 130 and the neural network accelerator 180 using the memory 125, the storage 127, or an input/output interface (not shown). In other examples, an emulator provides full emulation of the quantization, including only storing one copy of the shared exponent and operating with reduced mantissa widths. Some results may differ over versions where the underlying operations are performed in normal floating-point. For example, the full emulation version can check for underflow or overflow conditions for a limited, quantized bit width (e.g., 3-, 4-, or 5-bit wide mantissas).

The bulk of the computational cost of DNNs is in vector-vector, matrix-vector, and matrix-matrix multiplications and/or convolutions. These operations are quadratic in input sizes while operations such as bias add and activation functions are linear in input size. Thus, in some examples, quantization is only applied to matrix-vector multiplication operations, which is implemented on the neural network accelerator 180. In such examples, all other operations are done in a normal-precision format, such as float16. Thus, from the user or programmer's perspective, the quantization-enabled system 110 accepts and outputs normal-precision float16 values from/to the neural network module 130 and output float16 format values. All conversions to and from block floating-point format can be hidden from the programmer or user. In some examples, the programmer or user may specify certain parameters for quantization operations. In other examples, quantization operations can take advantage of block floating-point format to reduce computation complexity, as discussed below regarding FIG. 3.

The neural network accelerator 180 is used to accelerate evaluation and/or training of a neural network graph or subgraphs, typically with increased speed and reduced latency that is not realized when evaluating the subgraph using only the CPU 120 and/or the GPU 122. In the illustrated example, the accelerator includes a Tensor Processing Unit (TPU) 182, reconfigurable logic devices 184 (e.g., contained in one or more FPGAs or a programmable circuit fabric), and/or a subgraph accelerator 186, however any suitable hardware accelerator can be used that models neural networks. The accelerator 180 can include configuration logic which provides a soft CPU. The soft CPU supervises operation of the accelerated graph or subgraph on the accelerator 180 and can manage communications with the neural network module 130. The soft CPU can also be used to configure logic and to control loading and storing of data from RAM on the accelerator, for example in block RAM within an FPGA.

In some examples, parameters of the neural network accelerator 180 can be programmable. The neural network accelerator 180 can be used to prototype training, inference, or classification of all or a portion of the neural network model 200. For example, quantization parameters can be selected based on accuracy or performance results obtained by prototyping the network within neural network accelerator 180. After a desired set of quantization parameters is selected, a quantized model can be programmed into the accelerator 180 for performing further operations.

The compiler 132 and the runtime 133 provide a fast interface between the neural network module 130 and the neural network accelerator 180. In effect, the user of the neural network model may be unaware that a portion of the model is being accelerated on the provided accelerator. For example, node values are typically propagated in a model by writing tensor values to a data structure including an identifier. The runtime 133 associates subgraph identifiers with the accelerator, and provides logic for translating the message to the accelerator, transparently writing values for weights, biases, and/or tensors to the neural network accelerator 180 without program intervention. Similarly, values that are output by the neural network accelerator 180 may be transparently sent back to the neural network module 130 with a message including an identifier of a receiving node at the server and a payload that includes values such as weights, biases, and/or tensors that are sent back to the overall neural network model.

Figure 2:
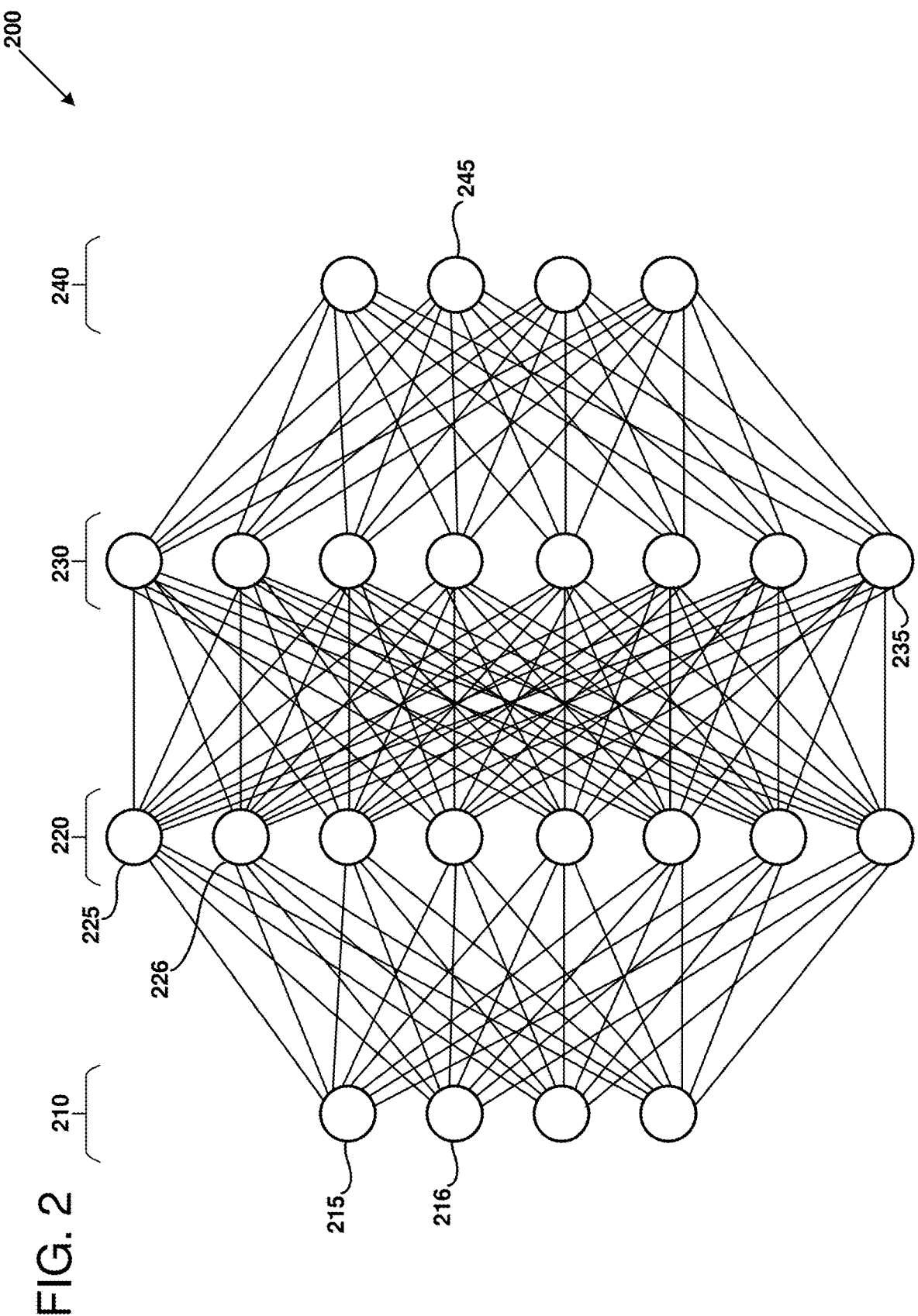
FIG. 2 is a diagram depicting a deep neural network, as can be modeled using certain example methods and apparatus disclosed herein.

FIG. 2 illustrates a simplified topology of a deep neural network (DNN) 200 that can be used to perform enhanced image processing using disclosed BFP implementations. One or more processing layers can be implemented using disclosed techniques for quantized and BFP matrix/vector operations, including the use of one or more of a plurality of neural network subgraph accelerators 186 in the quantization-enabled system 110 described above. It should be noted that applications of the neural network implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

The DNN 200 can operate in at least two different modes. Initially, the DNN 200 can be trained in a training mode and then used as a classifier in an inference mode. During the training mode, a set of training data can be applied to inputs of the DNN 200 and various parameters of the DNN 200 can be adjusted so that at the completion of training, the DNN 200 can be used as a classifier. Training includes performing forward propagation of the training input data, calculating a loss (e.g., determining a difference between an output of the DNN and the expected outputs of the DNN), and performing backward propagation through the DNN to adjust parameters (e.g., weights and biases) of the DNN 200. When an architecture of the DNN 200 is appropriate for classifying the training data, the parameters of the DNN 200 will converge and the training can complete. After training, the DNN 200 can be used in the inference mode. Specifically, training or non-training data can be applied to the inputs of the DNN 200 and forward propagated through the DNN 200 so that the input data can be classified by the DNN 200.

As shown in FIG. 2, a first set 210 of nodes (including nodes 215 and 216) form an input layer. Each node of the set 210 is connected to each node in a first hidden layer formed from a second set 220 of nodes (including nodes 225 and 226). A second hidden layer is formed from a third set 230 of nodes, including node 235. An output layer is formed from a fourth set 240 of nodes (including node 245). In example 200, the nodes of a given layer are fully interconnected to the nodes of its neighboring layer(s). In other words, a layer can include nodes that have common inputs with the other nodes of the layer and/or provide outputs to common destinations of the other nodes of the layer. In other examples, a layer can include nodes that have a subset of common inputs with the other nodes of the layer and/or provide outputs to a subset of common destinations of the other nodes of the layer.

During forward propagation, each of the nodes produces an output by applying a weight to each input generated from the preceding node and collecting the weights to produce an output value. In some examples, each individual node can have an activation function (σ) and/or a bias (b) applied. Generally, an appropriately programmed processor or FPGA can be configured to implement the nodes in the depicted neural network 200. In some example neural networks, an output function $f(n)$ of a hidden combinational node n can produce an output expressed mathematically as:

$$f(n) = \sigma\left(\sum_{i=0 \text{ to } R-3} w_i x_i + b\right)$$

where $w_i$ is a weight that is applied (multiplied) to an input edge $x_i$, b is a bias value for the node n, σ is the activation function of the node n, and E is the number of input edges of the node n. In some examples, the activation function produces a continuous value (represented as a floating-point number) between 0 and 1. In some examples, the activation function produces a binary 1 or 0 value, depending on whether the summation is above or below a threshold.

A given neural network can include thousands of individual nodes and so performing all of the calculations for the nodes in normal-precision floating-point can be computationally expensive. An implementation for a more computationally expensive solution can include hardware that is larger and consumes more energy than an implementation for a less computationally expensive solution. However, performing the operations using quantized floating-point or in mixed precision (using both normal-precision floating-point and quantized floating-point) can potentially reduce the computational complexity of the neural network. A simple implementation that uses only quantized floating-point may significantly reduce the computational complexity, but the implementation may have difficulty converging during training and/or correctly classifying input data because of errors introduced by the quantization. However, a mixed precision implementation can potentially increase an accuracy of some calculations while also providing the benefits of reduced complexity associated with quantized floating-point.

A mixed precision implementation of the DNN 200 can include nodes that perform operations in both normal precision floating-point and quantized floating-point. As a specific example, an output function $f(n)$ of a hidden combinational node n can produce an output expressed mathematically as:

$$f(n) = \sigma\left(Q^{-1}\left(\sum_{i=0 \text{ to } E-1} Q(w_i)Q(x_i)\right) + b\right)$$

where $w_i$ is a weight that is applied (multiplied) to an input edge $x_i$, $Q(w_i)$ is the quantized floating-point value of the weight, $Q(x_i)$ is the quantized floating-point value of the input sourced from the input edge $x_i$, $Q^{-1}(\ )$ is the de-quantized representation of the quantized floating-point value of the dot product of the vectors w and x, b is a bias value for the node n, 6 is the activation function of the node n, and E is the number of input edges of the node n. The computational complexity can potentially be reduced (as compared with using only normal-precision floating-point values) by performing the dot product using quantized floating-point values, and the accuracy of the output function can potentially be increased by (as compared with using only quantized floating-point values) by the other operations of the output function using normal-precision floating-point values.

Neural networks can be trained and retrained by adjusting constituent values of the output function $f(n)$. For example, by adjusting weights $w_i$ or bias values b for a node, the behavior of the neural network is adjusted by corresponding changes in the networks output tensor values. For example, a cost function C(w, b) can be used during back propagation to find suitable weights and biases for the network, where the cost function can be described mathematically as:

$$C(w, b) = \frac{1}{2n}\sum_x \|y(x) - a\|^2$$

where w and b represent all weights and biases, n is the number of training inputs, a is a vector of output values from the network for an input vector of training inputs x. By adjusting the network weights and biases, the cost function C can be driven to a goal value (e.g., to zero (0)) using various search techniques, for examples, stochastic gradient descent. The neural network is said to converge when the cost function C is driven to the goal value. Similar to the output function $f(n)$, the cost function can be implemented using mixed-precision computer arithmetic. For example, the vector operations can be performed using quantized floating-point values and operations, and the non-vector operations can be performed using normal-precision floating-point values.

Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification and artificial intelligence tasks.

A network accelerator (such as the network accelerator 180 in FIG. 1) can be used to accelerate the computations of the DNN 200. As one example, the DNN 200 can be partitioned into different subgraphs that can be individually accelerated. As a specific example, each of the layers 210, 220, 230, and 240 can be a subgraph that is accelerated. The computationally expensive calculations of the layer can be performed using quantized floating-point and the less expensive calculations of the layer can be performed using normal-precision floating-point. Values can be passed from one layer to another layer using normal-precision floating-point By accelerating a group of computations for all nodes within a layer, some of the computations can be reused and the computations performed by the layer can be reduced compared to accelerating individual nodes.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

As will be readily understood to one of ordinary skill in the art having the benefit of the present disclosure, the application of neural network implementations can be used for different aspects of using neural networks, whether alone or in combination or subcombination with one another. For example, disclosed implementations can be used to implement neural network training via gradient descent and/or back propagation operations for a neural network. Further, disclosed implementations can be used for evaluation of neural networks.

Figure 3:
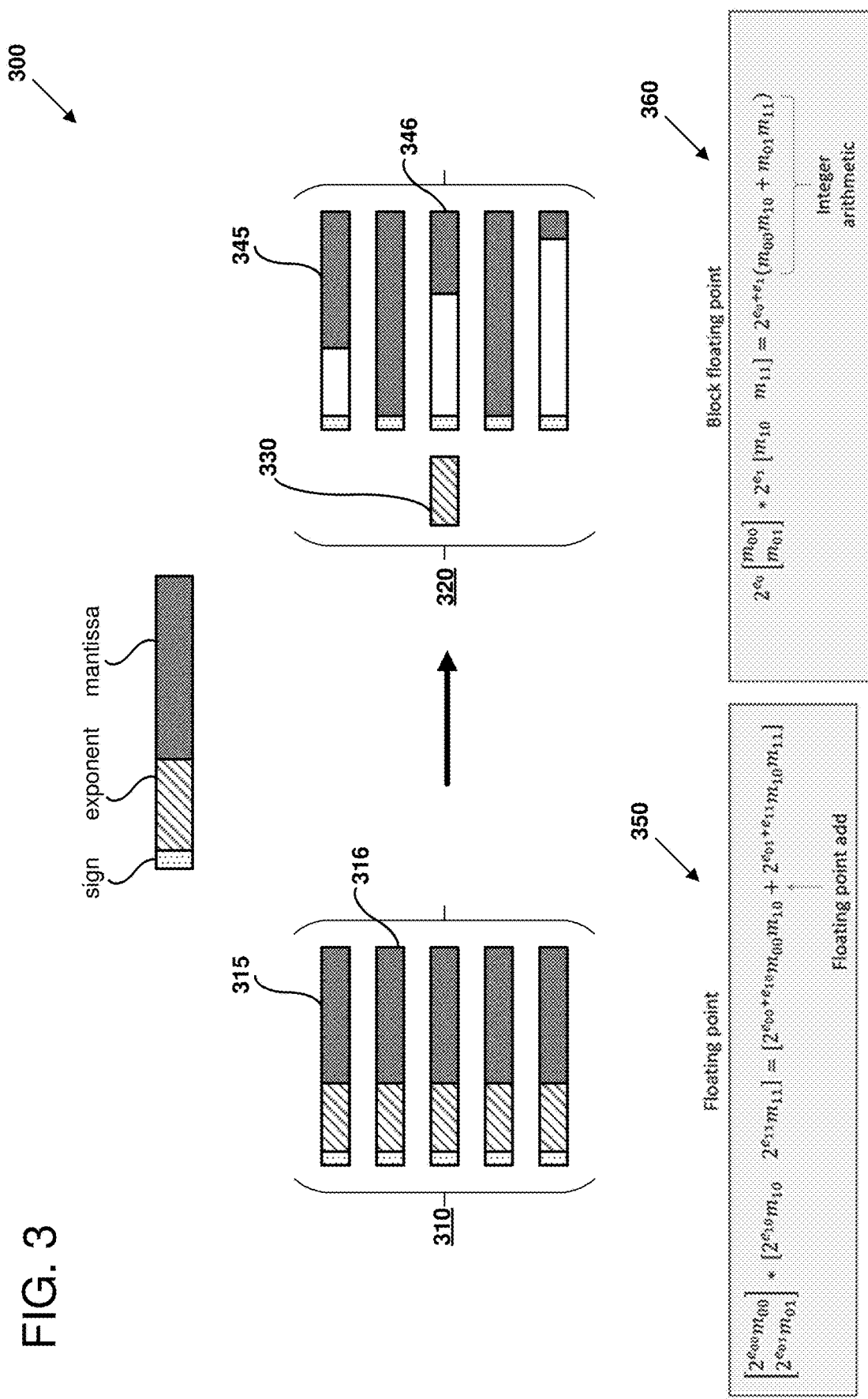
FIG. 3 is a diagram depicting certain aspects of converting a normal floating-point format to a quantized floating-point format, as can be performed in certain examples of the disclosed technology.

FIG. 3 is a diagram 300 illustrating an example of converting a normal floating-point format to a quantized, block floating-point format, as can be used in certain examples of the disclosed technology. For example, input tensors for a neural network represented as normal floating-point numbers (for example, in a 32-bit or 16-bit floating-point format) can be converted to the illustrated block floating-point format.

As shown, a number of normal floating-point format numbers 310 are represented such that each number for example number 315 or number 316 include a sign, an exponent, and a mantissa. For example, for IEEE 754 half precision floating-point format, the sign is represented using one bit, the exponent is represented using 5 bits, and the mantissa is represented using 10 bits. When the floating-point format numbers 310 in the neural network model 200 are converted to a set of quantized precision, block floating-point format numbers, there is one exponent value that is shared by all of the numbers of the illustrated set. Thus, as shown, the set of block floating-point numbers 320 are represented by a single exponent value 330, while each of the set of numbers includes a sign and a mantissa. However, since the illustrated set of numbers have different exponent values in the floating-point format, each number's respective mantissa may be shifted such that the same or a proximate number is represented in the quantized format (e.g., shifted mantissas 345 and 346).

Further, as shown in FIG. 3, use of block floating-point format can reduce computational resources required for certain common operations. In the illustrated example, a dot product of two floating-point vectors is illustrated in formal floating-point format (350) and in block floating-point format (360). For numbers represented in the normal-precision floating-point format operation 350, a floating-point addition is required to perform the dot product operation. In a dot product of floating-point vectors, the summation is performed in floating-point which can require shifts to align values with different exponents. On the other hand, for the block floating-point dot product operation 360, the product can be calculated using integer arithmetic to combine mantissa elements as shown. In other words, since the exponent portion can be factored in the block floating-point representation, multiplication and addition of the mantissas can be done entirely with fixed point or integer representations. As a result, large dynamic range for the set of numbers can be maintained with the shared exponent while reducing computational costs by using more integer arithmetic, instead of floating-point arithmetic. In some examples, operations performed by the quantization emulator 140 can be optimized to take advantage of block floating-point format.

In some examples, the shared exponent 330 is selected to be the largest exponent from among the original normal-precision numbers in the neural network model 200. In other examples, the shared exponent may be selected in a different manner, for example, by selecting an exponent that is a mean or median of the normal floating-point exponents, or by selecting an exponent to maximize dynamic range of values stored in the mantissas when their numbers are converted to the quantized number format. It should be noted that some bits of the quantized mantissas may be lost if the shared exponent and the value's original floating-point exponent are not the same. This occurs because the mantissa is shifted to correspond to the new, shared exponent.

There are several possible choices for which values in a block floating-point tensor will share an exponent. The simplest choice is for an entire matrix or vector to share an exponent. However, sharing an exponent over a finer granularity can reduce errors because it increases the likelihood of BFP numbers using a shared exponent that is closer to their original normal floating-point format exponent. Thus, loss of precision due to dropping mantissa bits (when shifting the mantissa to correspond to a shared exponent) can be reduced.

For example, consider multiplying a row-vector x by matrix W: y=xW. If an exponent is shared for each column of W, then each dot-product $xW_j$ (where $W_j$ is the j-th column of W only involves one shared exponent for x and one shared exponent for $W_j$.

FIGS. 4 and 5 illustrate alternative block floating-point formats that can be used for computation of neural networks. In the context of neural nets, a core operation is to perform a dot product. For example, dot products are the core computation of matrix multiplication and convolutions. Matrix multiplication involves dot products of the rows/columns of the matrix with an input vector. Convolutions involve dot products of filters with windows of the input. In the context of quantized floating-point, the group of values selected to share an exponent can have an impact on the complexity of the computer arithmetic logic used for calculating the dot product. The values sharing an exponent can be referred to as the values within a bounding box. The shape of bounding boxes can potentially impact quantization error and computation cost. While clustering similar magnitude values to create bounding boxes can reduce quantization error, tracking scaling factors for arbitrary bounding box shapes may be expensive. Instead, matrices and filters can be partitioned into bounding boxes that are potentially more efficient for the operations performed by a neural network. Specifically, an appropriate selection of the bounding box can reduce the complexity of computer arithmetic circuits that are used to implement the operations of the neural network. FIG. 4 illustrates block floating-point formats that may be well suited for matrices and FIG. 5 illustrates block floating-point formats that may be well suited for convolution filters.

FIG. 4 is a diagram 400 illustrating four alternative block floating-point formats, as can be used in certain examples of the disclosed technology. As shown, a first format 410 represents an entire array 420 of values that share a single exponent 425. In other words, the entire array 420 of values is encapsulated within a single bounding box.

In a second format 430, a common exponent is shared on a per-column basis. In other words, the columns of the matrix are the bounding box for the values. Thus, in this particular example, block floating-point values stored in even columns 431 of a matrix each share a first, single exponent 432. Block floating-point values stored in odd columns 435 each share a second, single exponent 437. In other examples, each column of an array can be associated with a different shared exponent. For an eleven-column tile in the alternative format, there can be eleven corresponding shared exponents, one shared exponent per column. In other examples, each row of an array can be associated with a different shared exponent, or odd and even rows can be associated with a shared common exponent.

A third format 450 is shown where groups of elements in an array share a common exponent. For example, if a 15×15 matrix of values shares in exponent according to the third format 450, a first set of 5×5 element groups 455 and 456 share a single shared exponent 458. Similarly, a second 5×5 element group of elements in the array 460 and 461 can each shared a second single exponent 468. In other examples, each of the tiles can be associated with its own respective shared exponent. In the example format 450, there could be nine shared exponents for the 15×15 matrix.

A fourth format 470 is shown where two shared exponents are shared on a tiling plus per-column basis. Thus, a first set of numbers including numbers 480, 481, and 485 all share a single common exponent 488. Similarly, a second set of numbers including a set 490 and 491 each share a second, different single exponent 495. In an alternative example, each of the groups shown can have its own shared exponent.

In some examples, the computational cost of matrix-vector multiplication can be further reduced by reducing mantissa widths. A large range of values having a shared common exponent can be expressed with only a few bits of mantissa. for example, in a representation with 4 bits of mantissa and a 5-bit exponent, values can be expressed in a range $[2^{-14}0.001_2, 2^{15}1.111_2]$, or approximately $[2^{-17}, 2^{16}]$. in contrast, a 4-bit fixed point number can only represent values in the range $[0001_2, 1111_2]$, or approximately $[2^0, 2^4]$.

FIG. 5 is a diagram 500 illustrating three alternative block floating-point formats, as can be used in certain examples of the disclosed technology. These formats may be useful for two-dimensional convolutions, but the formats can be generalized to higher-dimensional convolutions as well. As shown, a first format 510 represents an entire convolution filter 512 of values that share a single exponent 514. A different convolution filter 516 of values can share a single exponent 518. Thus, the format 510 illustrates that an entire convolution filter can be a bounding box of the values.

In a second format 520, each spatial pixel can be a bounding box so that a common exponent is shared on a per-spatial-pixel basis, along the channel dimension. As shown, the spatial pixel values 522 share a single exponent 524 and the spatial pixel values 526 share a single exponent 528. For example, for an input with dimensions [x, y, $c_i$], each spatial dimension x and y can define a bounding box with $c_i$ values. Similarly, for $c_o$ convolution filters of dimension [$f_x$, $f_y$, $c_i$], each pixel ($f_x$, $f_y$) for each of the $c_o$ filters can be a separate bounding box with $c_i$ values. The bounding box size for this approach is $c_i$.

In a third format 530, each spatial pixel can be sub-divided along the channel dimension so that a bounding box includes a sub-division of a spatial pixel. As shown, the sub-divided spatial pixel values 532 share a single exponent 534 and the sub-divided spatial pixel values 536 share a single exponent 538. For small $c_i$, the cost of handling the scaling factor can be significant. For example, input images at the first layer of deep convolutional neural nets may have $c_i$=3 corresponding to 3 color channels. Tracking a scaling factor for every triplet can be expensive. In this case, the convolution can be re-shaped into a matrix-matrix multiplication to increase the bounding box and decrease the expense of tracking the bounding box. For example, each convolution filter can be flattened to create a matrix W with $c_o$ columns and $f_x * f_y * c_i$ rows. An input matrix X can be created where each row is a $f_x * f_y * c_i$ vector corresponding to a window of the input that the convolution filter sweeps over. The result Y=XW is a matrix that can be re-shaped to match the output of the convolution operation. With the convolution re-formulated as matrix multiplication, the bounding box strategies discussed above in reference to FIG. 4 for matrix multiplication can be applied.

Figure 6:
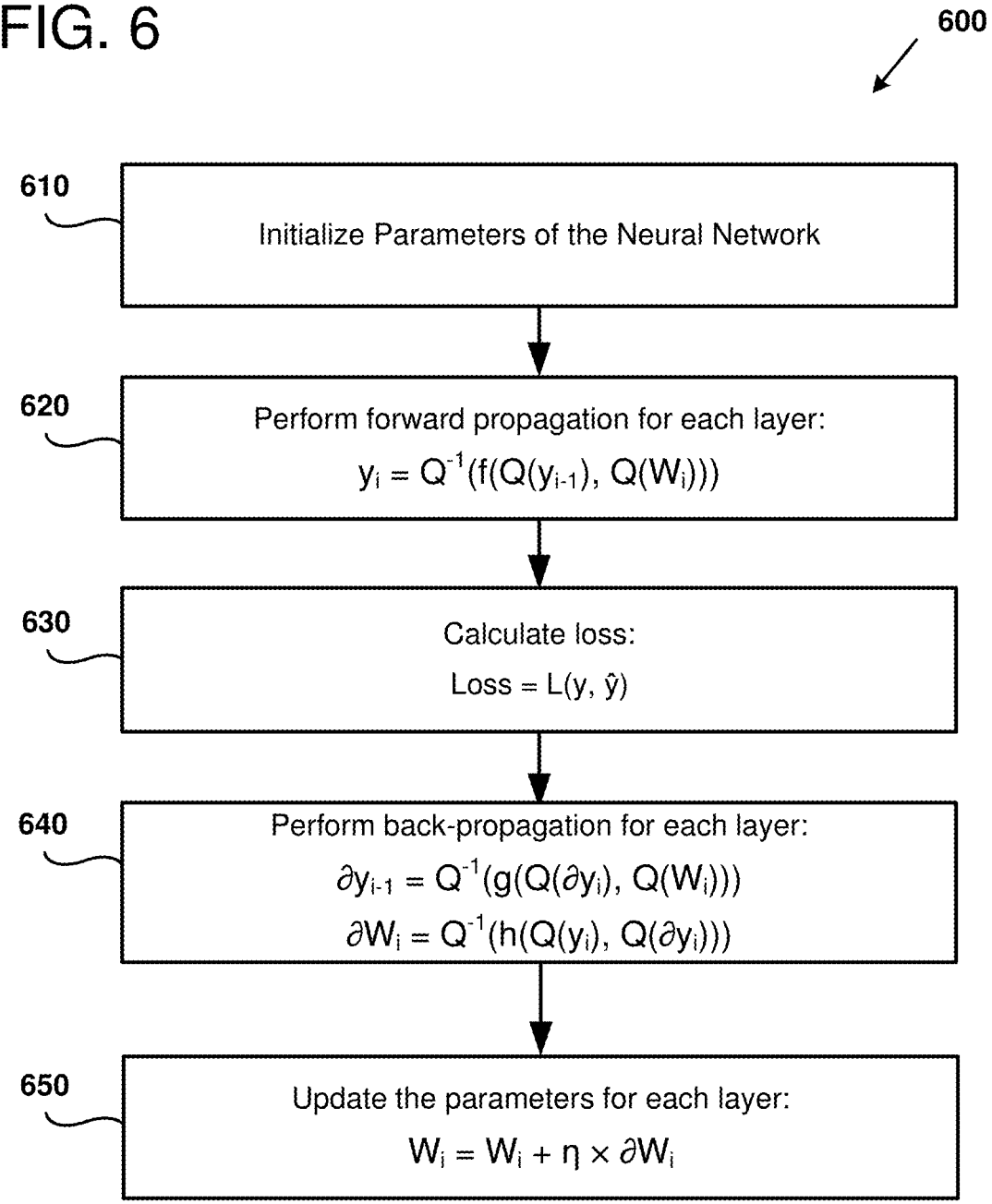
FIG. 6 is a flow diagram depicting a method of training a neural network for use with a quantized model, as can be implemented in certain examples of the disclosed technology.

FIG. 6 is a flow diagram depicting a method 600 of training a neural network using a quantized model, as can be implemented in certain examples of the disclosed technology. For example, training the neural network can include iterating through a set of training data, where the method 600 is used for updating the parameters of the neural network during a given iteration of training data. As one example, the method 600 can be performed by a quantization-enabled system, such as the quantization-enabled system 110 of FIG. 1.

At process block 610, parameters, such as weights and biases, of the neural network can be initialized. As one example, the weights and biases can be initialized to random normal-precision floating-point values. As another example, the weights and biases can be initialized to normal-precision floating-point values that were calculated from an earlier training set. The initial parameters can be stored in a memory or storage of the quantization-enabled system. In one example, the parameters can be stored as quantized floating-point values which can reduce an amount storage used for storing the initial parameters.

At process block 620, input values of the neural network can be forward propagated through the neural network. Input values of a given layer of the neural network can be an output of another layer of the neural network. The values can be passed between the layers from an output of one layer to an input of the next layer using normal-precision floating-point. The output function of the layer i can include a term that is described mathematically as:

$$y_i = Q^{-1}(f(Q(y_{i-1}), Q(W_i)))$$

where $y_{i-1}$ is the output from a layer providing the input to layer i, $W_i$ is the weight tensor for the layer i, $f(\ )$ is a forward function of the layer, $Q(\ )$ is a quantization function, and $Q^{-1}(\ )$ is a de-quantization function. The output function of the layer can be the de-quantized representation of $f(\ )$ or the output function can include additional terms, such as an activation function or the addition of a bias, that are performed using normal-precision floating-point (after de-quantization) or using quantized floating-point (before de-quantization). Generally, the inputs, outputs, and parameters of the layers are tensors. Typically, the inputs, outputs, and parameters of the layers will be vectors or matrices. The quantization function converts normal-precision floating-point values to quantized floating-point values. The quantization function can be selected to account for the type of input data and the types of operations performed by the layer i. For example, when $y_i$ and $W_i$ are two-dimensional matrices and the output function includes a term that takes the cross product of $y_{i-1}$ and W, the quantization function for $y_{i-1}$ can use a bounding box including a row or a portion of a row of $y_{i-1}$, and the quantization function for $W_i$ can use a bounding box including a column or a portion of a column of $W_i$. The computation can be more efficient when selecting the bounding boxes to follow the flow of the operators, thus making a hardware implementation smaller, faster, and more energy efficient. The de-quantization function converts quantized floating-point values to normal-precision floating-point values.

At process block 630, a loss of the neural network can be calculated. For example, the output y of the neural network can be compared to an expected output ŷ of the neural network. A difference between the output and the expected output can be an input to a cost function that is used to update the parameters of the neural network.

At process block 640, the loss of the neural network can be back-propagated through the neural network. During back propagation, an output error term ∂y and a weight error term ∂W can be calculated. The output error term can be described mathematically as:

$$\partial_{i-1} = Q^{-1}(g(Q(\partial y_i), Q(W_i)))$$

where $\partial y_{i-1}$, is the output error term from a layer following layer i, $W_i$ is the weight tensor for the layer i, $g(\ )$ is a backward function of the layer, $Q(\ )$ is a quantization function, and $Q^{-1}(\ )$ is a de-quantization function. The backward function $g(\ )$ can be the backward function of $f(\ )$ for a gradient with respect to $y_{i-1}$ or a portion of the gradient function. The output error term of the layer can be the de-quantized representation of $g(\ )$ or the output error term can include additional terms that are performed using normal-precision floating-point (after de-quantization) or using quantized floating-point (before de-quantization).

The weight error term ∂W can be described mathematically as:

$$\partial W_i = Q^{-1}(h(Q(y_i), Q(\delta y_i)))$$

where $\partial W_i$ is the weight error term for the layer i, $\partial y_i$ is the output error term for the layer i, $y_i$ is the output for the layer i, $h(\ )$ is a backward function of the layer, $Q(\ )$ is a quantization function, and $Q^{-1}(\ )$ is a de-quantization function. The backward function $h(\ )$ can be the backward function of $f(\ )$ for a gradient with respect to $W_{i-1}$ or a portion of the weight error equation. The weight error term of the layer can be the de-quantized representation of $h(\ )$ or the weight error term can include additional terms that are performed using normal-precision floating-point (after de-quantization) or using quantized floating-point (before de-quantization). The weight error term can include additional terms that are performed using normal-precision floating-point.

At process block 650, the parameters for each layer can be updated. For example, the weights for each layer can be updated by calculating new weights based on the iteration of training. As one example, a weight update function can be described mathematically as:

$$W_i = W_i + \eta \times \partial W_i$$

where $\partial W_i$ is the weight error term for the layer i, $\eta$ is the learning rate for the layer i for the neural network, $W_i$ is the weight tensor for the layer i. In one example, the weight update function can be performed using normal-precision floating-point.

Figure 7:
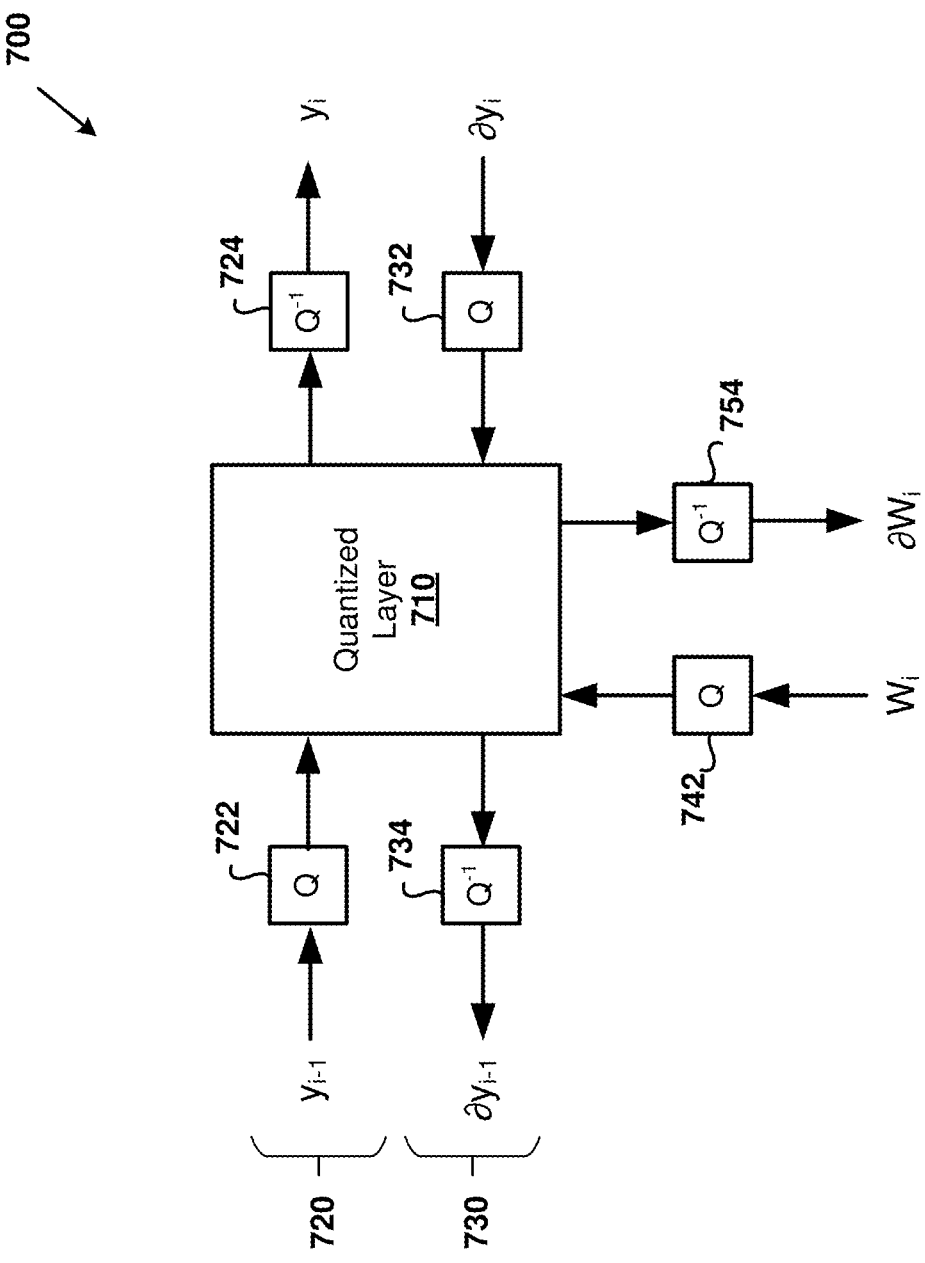
FIG. 7 is a block diagram depicting a mixed-precision floating point environment and a boundary between normal-precision floating-point domain and the quantized floating-point domain, as can be implemented in certain examples of the disclosed technology.

FIG. 7 is a block diagram 700 depicting an example of a mixed-precision floating point environment and a partition between a normal-precision floating-point domain and a quantized floating-point domain. As described above, more computationally expensive operations such as vector-vector, vector-matrix, matrix-matrix, and convolution operations can be performed by the quantized layer 710 in the quantized floating-point domain. Less computationally expensive operations such as scalar add and scalar multiply can be performed outside of the quantized layer 710 in the normal-precision floating-point domain. With regard to neural networks, a neural network can be partitioned into layers (such as layer 710). The bulk of the computational work within a layer can be performed in the quantized floating-point domain and less computationally expensive operations of the layer, such as adding a bias value or calculating an activation function, can be performed in the normal-precision floating-point domain. The values that interface between the layers can be passed from one layer to the other layer in the normal-precision floating-point domain. By quantizing the inputs specifically for a given layer, the quantization can be targeted to the operations of that layer so that the operations of the layer are more efficient. Specifically, bounding boxes of the quantized floating-point format can be selected to reduce the complexity of the computer arithmetic circuits to make the computer logic potentially faster and/or more energy efficient.

As one example, the output values $y_i$, the output error term $\partial y_i$, the weights $W_i$, and the weight error terms $\partial W_i$ for a given layer can be stored in the normal-precision floating-point domain. During the forward propagation flow 720, the output values from an earlier layer can be communicated from the normal-precision floating-point domain to the quantized floating-point domain through the quantizer 722 that converts from normal-precision floating-point to quantized floating-point. The output values from the given layer can be communicated from the quantized floating-point domain to the normal-precision floating-point domain through the de-quantizer 724 that converts from quantized floating-point to normal-precision floating-point. The weights for the given layer can be communicated from the normal-precision floating-point domain to the quantized floating-point domain through the quantizer 742.

During the back-propagation flow 730, the output error term from a later layer can be communicated from the normal-precision floating-point domain to the quantized floating-point domain through the quantizer 732. The output error term from the given layer can be communicated from the quantized floating-point domain to the normal-precision floating-point domain through the de-quantizer 734. The weights for the given layer can be communicated from the normal-precision floating-point domain to the quantized floating-point domain through the quantizer 742. The weight error term error term from the given layer can be communicated from the quantized floating-point domain to the normal-precision floating-point domain through the de-quantizer 754.

Figure 8:
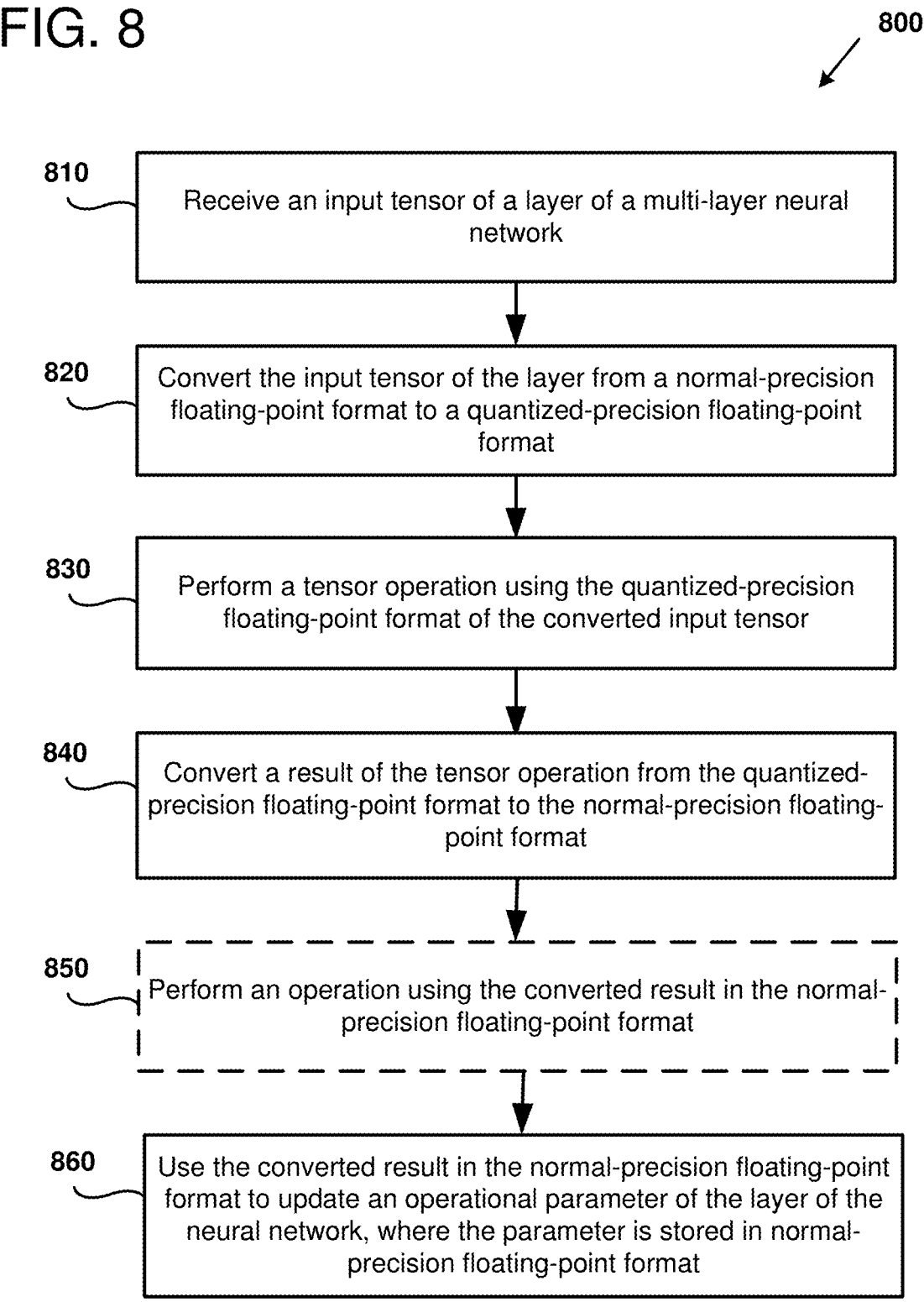
FIG. 8 is a flow diagram depicting a method of training a neural network accelerator using mixed precision data formats, as can be implemented in certain examples of the disclosed technology.

Example Methods for Using Mixed Precision Floating-Point to Train Neural Networks FIG. 8 is a flow diagram depicting an example method 800 of training a neural network accelerator using mixed precision data formats. The mixed precision data formats can include a normal-precision floating-point format and a quantized-precision floating-point format. As one example, the method 800 can be performed by a neural network accelerator of a quantization-enabled system, such as the neural network accelerator 180 of the quantization-enabled system 110 of FIG. 1.

At process block 810, an input tensor of a layer of a multi-layer neural network can be received. The input tensor of the layer can be an input during a forward propagation or a back-propagation mode of the neural network. For example, the input tensor can be input values (e.g., $x_i$) from the input edges of the layer or operational parameters of the layer, such as weights (e.g., $W_i$), a convolutional filter, or bias values. As another example, the input tensor can be an output error term being back-propagated from an adjacent layer during back-propagation. The input tensor can be received from an input/output interface of the neural network accelerator, an on-chip memory, an off-chip memory, or other storage location. The input tensor can include multiple normal-precision floating-point values, where each value includes a sign, a mantissa value, and an exponent value. The input tensor can be a vector or a multidimensional array.

At process block 820, the input tensor of the layer can be converted from a normal-precision floating-point format to a quantized-precision floating-point format. Converting from the normal-precision floating-point format to the quantized-precision floating-point format can include selecting a bounding box around a set of normal-precision floating-point values, determining a shared exponent for the shared normal-precision floating-point values, and adjusting bit widths of mantissa values for the normal-precision floating-point values (such as by reducing the number of bits of the mantissa in the quantized-floating point value and shifting the mantissa values to account for the shared exponent). For example, the quantized-precision floating-point format can be a block floating-point format that groups multiple values together so that a plurality of mantissa values can share a common exponent. The values grouped together within a bounding box and sharing an exponent in the block floating-point format can be selected based on the dimensions of the input tensor and/or the operations to be performed within the layer. The bounding box can be a row, a column, a portion of a row or column, a two-dimensional shape, or a three-dimensional shape, for example. The bounding boxes used for quantization can be different during forward propagation than during backward propagation.

As a specific example, the layer can receive a pair of input tensors, A and B, that are two-dimensional matrices to be multiplied within the layer. In other words, the layer can perform the matrix multiply AB. Performing the matrix multiply AB includes taking dot products of the rows of A with the columns of B. Bounding boxes can be selected to include the rows of A (or at least portions of the rows of A) and bounding boxes can be selected around the columns of B (or at least portions of the rows of B). Thus, quantizing the input tensor A can include grouping mantissa values of a row with a shared exponent and quantizing the input tensor B can include grouping mantissa values of a column with a shared exponent. For a three-dimensional convolutional filter, quantizing the input tensor can include grouping a shared exponent with mantissa values of a spatial pixel along the channel dimension.

At process block 830, a tensor operation can be performed using the quantized-precision floating-point format of the converted input tensor as an input. For example, the tensor operation can be a vector-vector, vector-matrix, matrix-matrix, or convolution operation. For example, the tensor operation can be an add, multiply, dot-product, convolution, or other operation that combines tensor elements to produce a result. The output result of the tensor operation can be a scalar value or a tensor value.

At process block 840, a result of the tensor operation can be converted from the quantized-precision floating-point format to the normal-precision floating-point format. Converting from the quantized-precision floating-point format to the normal-precision floating-point format can include generating an exponent value for a normal-precision floating-point value and adjusting a mantissa values for the normal-precision floating-point values (such as increasing the number of bits of the mantissa values and/or shifting the mantissa values to account for the generated exponent).

At optional process block 850, an operation can be performed using the converted result in the normal-precision floating-point format. For example, a scalar add (such as adding a bias value) or an activation function can be computed using the converted result in the normal-precision floating-point format.

At process block 860, the converted result in the normal-precision floating-point format can be used to update an operational parameter of the layer of the neural network, where the parameter is stored in normal-precision floating-point format. For example, the operational parameter can be a weight or a bias value of the layer. By updating the operational parameter of the layer, the neural network will behave differently than an untrained neural network for a given input stimulus. For example, by training the neural network and updating the operational parameters, the neural network can learn to classify input data (such as image data, audio data, or other sensory data) into categories.

Figure 9:
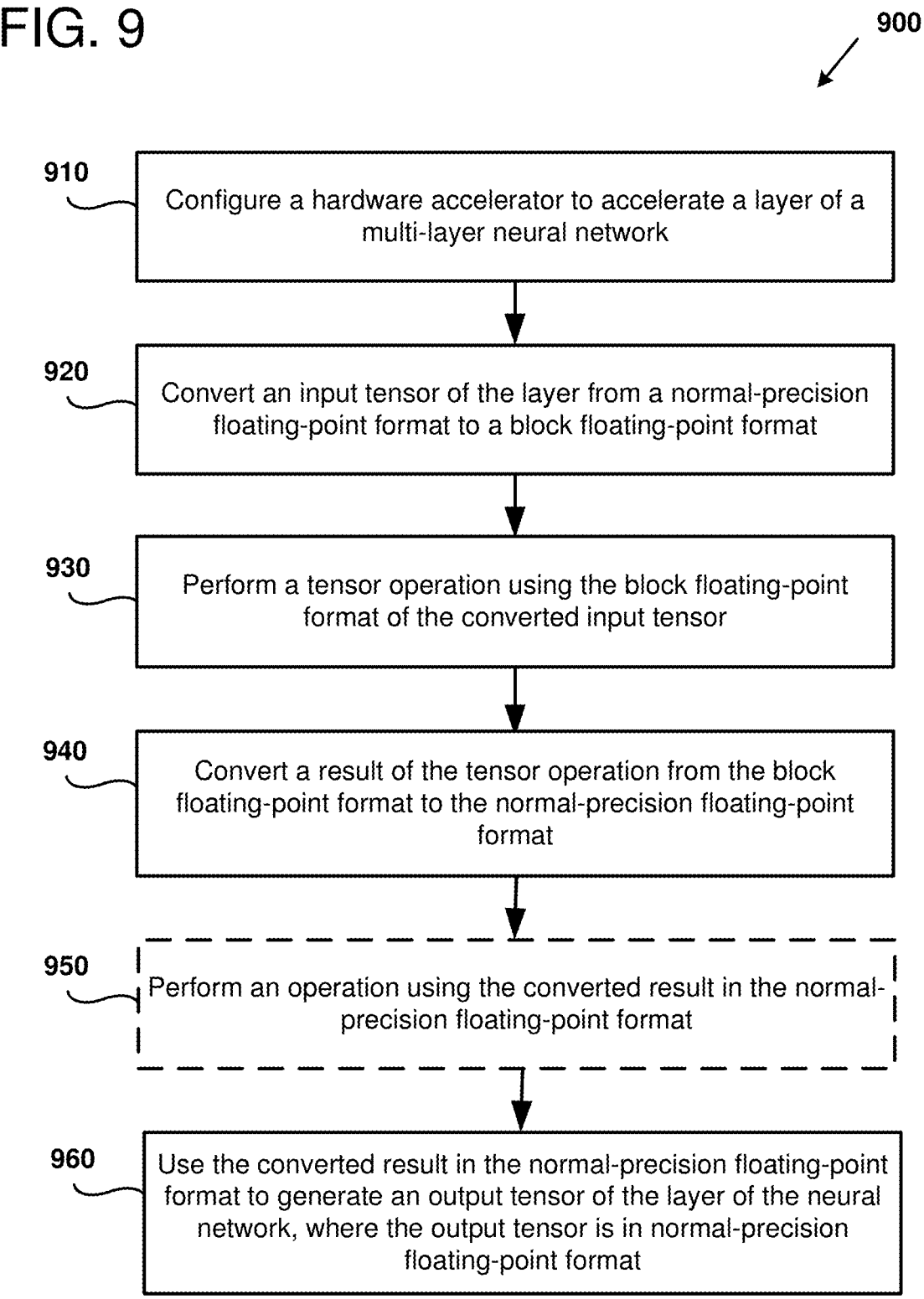
FIG. 9 is a flow diagram depicting a method of operating a neural network accelerator using mixed precision data formats, as can be implemented in certain examples of the disclosed technology.

FIG. 9 is a flow diagram depicting an example method 900 of operating a neural network accelerator using mixed precision data formats. The mixed precision data formats can include a normal-precision floating-point format and a block floating-point format. As one example, the method 900 can be performed by a quantization-enabled system, such as the neural network accelerator 180 of the quantization-enabled system 110 of FIG. 1.

At process block 910, a hardware accelerator can be configured to accelerate a layer of a multi-layer neural network. The hardware accelerator can include a tensor processing unit (TPU), a soft processor core, programmable logic (e.g., programmable look-up tables (LUTs) and/or block RAMs), and/or application-specific circuits for accelerating neuron and/or neuron layer computations. Configuring the hardware accelerator can include loading instructions for a TPU, soft processor core, or other special-purpose processor; and/or loading configuration data onto programmable logic resources so that the programmable logic performs tasks that accelerate neural network operations. The layer can be a convolutional layer, a fully connected layer, a partially connected layer, a layer of a long-short-term memory (LSTM) network, or a layer of a recurrent neural network (RNN), for example.

At process block 920, an input tensor of the layer can be converted from a normal-precision floating-point format to a block floating-point format. The input tensor of the layer can be an input during a forward propagation or a back-propagation mode of the neural network. For example, during forward propagation, the input tensor can be input values from the input edges of the layer or operational parameters of the layer, such as weights or bias values. During back-propagation, the input tensor can be an output error term being back-propagated from an adjacent layer or operational parameters of the layer. The input tensor can be received from an input/output interface of the neural network accelerator, an on-chip memory, an off-chip memory, or other storage location. The input tensor can include multiple normal-precision floating-point values, where each value includes a sign, a mantissa value, and an exponent value. Converting from the normal-precision floating-point format to the quantized-precision floating-point format can include selecting a bounding box around a set of normal-precision floating-point values, determining a shared exponent for the shared normal-precision floating-point values, and adjusting bit widths of mantissa values for the normal-precision floating-point values (such as by reducing the number of bits of the mantissa in the quantized-floating point value and shifting the mantissa values to account for the shared exponent). For example, the quantized-precision floating-point format can be a block floating-point format that groups multiple values together so that a plurality of mantissa values can share a common exponent. The values grouped together and sharing an exponent in the block floating-point format can be selected based on the dimensions of the input tensor and/or the operations to be performed within the layer.

At process block 930, a tensor operation can be performed using the block floating-point format of the converted input tensor. For example, the tensor operation can be a vector-vector, vector-matrix, matrix-matrix, or convolution operation. For example, the tensor operation can be an add, multiply, dot-product, convolution, or other operation that combines tensor elements to produce a result. The output result of the tensor operation can be a scalar value or a tensor value.

At process block 940, a result of the tensor operation can be converted from the block floating-point format to the normal-precision floating-point format. For example, the result can be an intermediate value of a node of the layer, an output value of a node of the layer, or an operational parameter such as a weight or a bias value of the layer. Converting from the quantized-precision floating-point format to the normal-precision floating-point format can include generating an exponent value for a normal-precision floating-point value and adjusting a mantissa values for the normal-precision floating-point values (such as increasing the number of bits of the mantissa values and/or shifting the mantissa values to account for the generated exponent).

At optional process block 950, an operation can be performed using the converted result in the normal-precision floating-point format. For example, a scalar add (such as adding a bias value) or an activation function can be computed using the converted result in the normal-precision floating-point format.

At process block 960, the converted result in the normal-precision floating-point format can be used to generate an output tensor of the layer of the neural network, where the output tensor is in normal-precision floating-point format. The values transferred between the layers of the neural network can be passed in the normal-precision floating-point format, which may increase an accuracy of the neural network allowing for faster convergence during training and for more accurate inferences. By updating the output tensor of the layers of the neural network, the neural network can potentially classify input data (such as image data, audio data, or other sensory data) into categories.

Additional Examples of the Disclosed Technology

Additional examples of the disclosed subject matter are discussed herein in accordance with the examples discussed above.

In one example of the disclosed technology, a computing system includes a computer-readable memory storing an operational parameter of a given layer of a neural network. The computing system further includes a hardware accelerator in communication with the computer-readable memory. The hardware accelerator is configured to receive an input tensor for a given layer of a multi-layer neural network. The input tensor is converted from a normal-precision floating-point format to a quantized-precision floating-point format. A tensor operation is performed using the input tensor converted to the quantized-precision floating-point format. A result of the tensor operation is converted from the quantized-precision floating-point format to the normal-precision floating-point format. The converted result is used in the normal-precision floating-point format to update the operational parameter stored in the computer-readable memory, where the parameter is stored in normal-precision floating-point format. Using the converted result in the normal-precision floating-point format to update the operational parameter can include performing a scalar operation that uses the converted result in the normal-precision floating-point format to generate the operational parameter.

The quantized-precision floating-point format can be a block floating-point format having a plurality of mantissa values that share a common exponent. For example, the input tensor can be a two-dimensional matrix, and the block floating-point format can have a plurality of mantissa values within a given row share a common exponent, and mantissa values in different rows have different respective exponents. The input tensor can be a convolution filter, and the block floating-point format can have a plurality of mantissa values within a spatial pixel share a common exponent.

The tensor operation can be a matrix-matrix multiply. The tensor operation can be a dot product computation. The tensor operation can be a convolution. The tensor operation can be a vector-vector or vector-matrix operation. The tensor operation can be performed during a forward-propagation mode or a back-propagation mode of the neural network. For example, during a back-propagation mode, the input tensor can be an output error term from a layer adjacent to (e.g., following) the given layer or weights of the given layer. As another example, during a forward-propagation mode, the input tensor can be an output term from a layer adjacent to (e.g., preceding) the given layer or weights of the given layer.

In one example, a method for a neural network accelerator includes configuring the neural network accelerator to accelerate a given layer of a multi-layer neural network. An input tensor for the given layer is converted from a normal-precision floating-point format to a block floating-point format. a tensor operation is performed using the input tensor converted to the block floating-point format. A result of the tensor operation is converted from the block floating-point format to the normal-precision floating-point format. The converted result in the normal-precision floating-point format is used to generate an output tensor of the layer of the neural network, where the output tensor is in normal-precision floating-point format.

Configuring the neural network accelerator to accelerate a given layer of a multi-layer neural network can include loading configuration data onto programmable hardware so that the programmable hardware performs the operations of the given layer of a multi-layer neural network. Configuring the neural network accelerator to accelerate a given layer of a multi-layer neural network can include programming a tensor processing unit. Configuring the neural network accelerator to accelerate the given layer of the multi-layer neural network can include initializing weights of input edges of the given layer of the multi-layer neural network.

Converting the input tensor for the given layer from the normal-precision floating-point format to the block floating-point format can include selecting a bounding box for a plurality of elements of the input tensor. The bounding box can be selected based on the tensor operation performed. The tensor operation performed can be a matrix-matrix multiply and the selected bounding box can be a column of a matrix of the input tensor. The tensor operation performed can be a matrix-matrix multiply and the selected bounding box can be a row of a matrix of the input tensor. Converting the input tensor for the given layer from the normal-precision floating-point format to the block floating-point format can include: selecting a bounding box for a plurality of elements of the input tensor; identifying a shared exponent for the selected plurality of elements within the bounding box of the input tensor; scaling mantissa values of the elements of the input tensor so that integer portions of the scaled mantissas have a selected number of bits for the block floating-point format; removing fractional bits from the scaled integer portions of the mantissas; and rounding the mantissas to produce block floating-point values.

In one example, one or more computer-readable media store computer-executable instructions, which when executed by a neural network accelerator, cause the neural network accelerator to perform operations. The operations include converting an input tensor for a given layer of a multi-layer neural network from a normal-precision floating-point format to a block floating-point format. The operations include performing a tensor operation using an operational parameter of the given layer of the neural network and the input tensor converted to the block floating-point format. For example, the tensor operation can be a convolution or a matrix-matrix multiply. As another example, the tensor operation can be performed during a back-propagation mode or a forward-propagation mode of the neural network The operations include converting a result of the tensor operation from the block floating-point format to the normal-precision floating-point format. The operations include using the converted result in the normal-precision floating-point format to update the operational parameter stored in the one or more computer-readable media.

The input tensor can be a two-dimensional matrix. Converting the input tensor from the normal-precision floating-point format to the block floating-point format can include selecting a plurality of elements within a column of the two-dimensional matrix to share a common exponent in the block floating-point format. Converting the input tensor from the normal-precision floating-point format to the block floating-point format can include selecting a plurality of elements within a row of the two-dimensional matrix to share a common exponent in the block floating-point format.

Example Computing Environment

Figure 10:
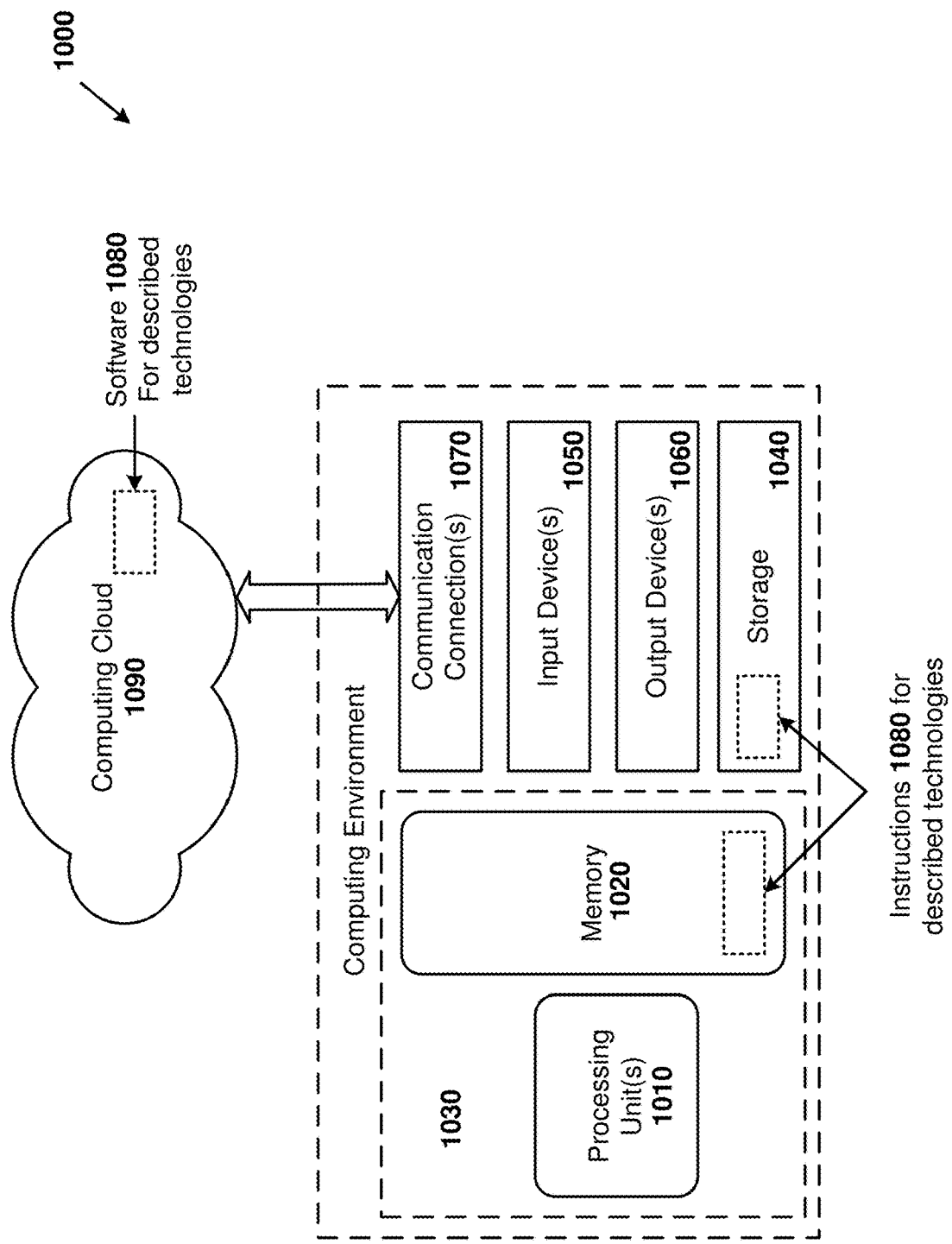
FIG. 10 is a block diagram illustrating a suitable computing environment for implementing some embodiments of the disclosed technology.

FIG. 10 illustrates a generalized example of a suitable computing environment 1000 in which described embodiments, techniques, and technologies, including supporting a multi-language playback framework, can be implemented.

The computing environment 1000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080, images, and video that can, for example, implement the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and that can be accessed within the computing environment 1000. The storage 1040 stores instructions for the software 1080, plugin data, and messages, which can be used to implement technologies described herein.

The input device(s) 1050 may be a touch input device, such as a keyboard, keypad, mouse, touch screen display, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, video, or other data in a modulated data signal. The communication connection(s) 1070 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1090. For example, the disclosed methods can be executed on processing units 1010 located in the computing environment 1030, or the disclosed methods can be executed on servers located in the computing cloud 1090.

Computer-readable media are any available media that can be accessed within a computing environment 1000. By way of example, and not limitation, with the computing environment 1000, computer-readable media include memory 1020 and/or storage 1040. As should be readily understood, the term computer-readable storage media includes the media for data storage such as memory 1020 and storage 1040, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A computing system comprising:
a computer-readable memory storing an operational parameter of a given layer of a neural network; and
a hardware accelerator in communication with the computer-readable memory for accelerating tensor operations, the hardware accelerator configured to:
receive an input tensor for a given layer of a multi-layer neural network;
convert the input tensor from a normal-precision floating-point format to a quantized-precision floating-point format, the quantized-precision floating-point format being a block floating-point format, wherein a first converted input tensor portion corresponding to a first portion of the input tensor comprises a first common exponent for values in the first portion of the input tensor and a first plurality of mantissa values and a second converted tensor portion corresponding to a second portion of the input tensor comprises a second common exponent value for values in the second portion of the input tensor and a second plurality of mantissa values, wherein the first common exponent is different than the second common exponent;
perform a tensor operation using the input tensor converted to the quantized-precision floating-point format;
convert a result of the tensor operation from the quantized-precision floating-point format to the normal-precision floating-point format to provide a converted result in the normal-precision floating-point format; and
in a training iteration of a plurality of iterations of training of the multi-layer neural network, updating the operational parameter of the given layer of the multi-layer neural network stored in the computer-readable memory using the converted result in the normal precision floating-point format, where the operational parameter of the given layer of the neural network is stored in normal-precision floating-point format.

2. The computing system of claim 1, wherein the input tensor is a two-dimensional matrix, and the quantized-precision floating-point format is a block floating-point format where a plurality of mantissa values within a given row share a common exponent, and mantissa values in different rows have different respective exponents.

3. The computing system of claim 1, wherein the input tensor is a convolution filter, and the quantized-precision floating-point format is a block floating-point format where a plurality of mantissa values within a spatial pixel share a common exponent.

4. The computing system of claim 1, wherein the tensor operation is performed during a back-propagation mode of the neural network, the input tensor is an output error term from an adjacent layer to the given layer.

5. The computing system of claim 1, wherein the tensor operation is a dot product computation.

6. The computing system of claim 1, wherein the tensor operation is a convolution.

7. The computing system of claim 1, wherein the tensor operation is performed during a back-propagation phase of training the neural network.

8. The computing system of claim 1, wherein using the converted result in the normal-precision floating-point format to update the operational parameter comprises performing a scalar operation that uses the converted result in the normal-precision floating-point format to generate the operational parameter.

9. The computing system of claim 8, wherein the scalar operation is performed for a single layer of the neural network.

10. The computing system of claim 8, wherein the scalar operation comprises adding a bias to the converted result.

11. The computing system of claim 8, wherein the scalar operation comprises applying an activation function to the converted result.

12. A method, implemented in a computing system, comprising:

converting an input tensor for a given layer of a multi-layer neural network from a normal-precision floating-point format to converted values represented in a block floating-point format by (1) for a first portion on the input tensor, selecting a first bounding box including a first set of values expressed in the normal-precision floating-point format and where the block floating-point format uses a first common exponent for converted values of the first set of values; and (2) for a second portion of the input tensor, selecting a second bounding box comprising a second set of values expressed in the normal-precision floating point format and where the block-floating point format uses a second common exponent for converted values of the second set of values, where the second set of values is different from the first set of values and the second common exponent is different from the first common exponent;

performing a tensor operation using the converted values in the input tensor converted to the block floating-point format;

converting a result of the tensor operation from the block floating-point format to the normal-precision floating-point format;

using the converted result in the normal-precision floating-point format to generate an output tensor of the layer of the neural network, where the output tensor is in normal-precision floating-point format; and in a training iteration of a plurality of iterations of training of the multi-layer neural network, updating an operational parameter of the multi-layer neural network using the converted result in the normal precision floating-point format, where the operational parameter of the given layer of the neural network is maintained in normal-precision floating-point format.

13. The method of claim 12, further comprising loading configuration data onto programmable hardware of a neural network accelerator so that the programmable hardware performs the operations of the given layer of a multi-layer neural network.

14. The method of claim 12, further comprising, in a neural network accelerator, initializing weights of input edges of the given layer of the multi-layer neural network.

15. The method of claim 12, wherein the first bounding box is a row of a matrix of the input tensor.

16. The method of claim 12, first bounding box is a column of a matrix of the input tensor.

17. The method of claim 12, wherein converting the input tensor for the given layer from the normal-precision floating-point format to the block floating-point format comprises:

selecting a bounding box for a plurality of elements of the input tensor;

identifying a shared exponent for the first set of values within the bounding box of the input tensor;

scaling mantissa values of the elements of the input tensor so that integer portions of the scaled mantissas have a selected number of bits for the block floating-point format;

removing fractional bits from the scaled integer portions of the mantissas; and rounding the mantissas to produce block floating-point values.

18. The method of claim 12, wherein the multi-layer neural network is a recurrent neural network, further comprising configuring a neural network accelerator to accelerate the given layer of the multi-layer neural network comprises programming hardware to perform a function of a layer of the recurrent neural network.

19. The method of claim 12, performed in a neural network accelerator.

20. One or more non-transitory computer-readable media comprising:

computer-executable instructions that, when executed by a computing device, cause the computing device to convert an input tensor for a given layer of a multi-layer neural network from a normal-precision floating-point format to a block floating-point format, by (1) for a first portion of the input tensor, selecting a first bounding box around a first set of values expressed with the normal-precision floating-point format and where the block floating-point format uses a first common exponent for converted values of the first set of values; and (2) for a second portion of the input tensor, selecting a second bounding box comprising a second set of values expressed in the normal-precision floating point format and where the block-floating point format uses a second common exponent for converted values of the second set of values, where the second set of values is different from the first set of values and the second common exponent is different from the first common exponent;

computer-executable instructions that, when executed by the computing device, cause the computing device to perform a tensor operation using an operational parameter of the given layer of the neural network and the input tensor converted to the block floating-point format;

computer-executable instructions that, when executed by the computing device, cause the computing device to convert a result of the tensor operation from the block floating-point format to the normal-precision floating-point format to provide a converted result in the normal-precision floating-point format; and computer-executable instructions that, when executed by the computing device, cause the computing device to, in a training iteration of a plurality of iterations of training of the multi-layer neural network, update the operational parameter using the converted result in the normal-precision floating-point format.

21. The one or more non-transitory computer-readable media of claim 20, wherein the input tensor is a two-dimensional matrix, and the computer-executable instructions that cause the computing device to convert the input tensor from the normal-precision floating-point format to the block floating-point format comprises selecting a plurality of elements within a column of the two-dimensional matrix to share a common exponent in the block floating-point format.

22. The one or more non-transitory computer-readable media of claim 20, wherein the input tensor is a two-dimensional matrix, and the computer-executable instructions that cause the computing device to convert the input tensor from the normal-precision floating-point format to the block floating-point format comprises selecting a plurality of elements within a row of the two-dimensional matrix to share a common exponent in the block floating-point format.

23. The one or more non-transitory computer-readable media of claim 20, wherein the tensor operation is performed during a back-propagation mode of the neural network.

* * * * *